United States Patent [19]

Yasuda

[11] Patent Number: 5,134,767
[45] Date of Patent: Aug. 4, 1992

[54] AUTOMATIC TOOL CHANGING DEVICE IN MACHINE TOOL

[75] Inventor: Shoki Yasuda, Nagoya, Japan

[73] Assignee: Brother Kogyo Kabushiki Kaisha, Nagoya, Japan

[21] Appl. No.: 663,673

[22] Filed: Mar. 4, 1991

[30] Foreign Application Priority Data

Mar. 15, 1990 [JP] Japan .................. 2-65407

[51] Int. Cl.⁵ .................. B23Q 3/157; G05B 19/18
[52] U.S. Cl. ........................... 483/7; 318/571;
364/474.3; 364/474.21; 483/47; 483/56
[58] Field of Search ............... 29/568, 26 A; 408/35;
364/474.3, 474.21; 318/571

[56] References Cited

U.S. PATENT DOCUMENTS 4,815,007 3/1989 Sakai et al. ............ 318/571 X
4,835,838 6/1989 Hirose ...................... 29/568
4,994,978 2/1991 Kawamura et al. ........... 364/474.3

FOREIGN PATENT DOCUMENTS 1-124003 5/1989 Japan .

Primary Examiner—Z. R. Bilinsky
Attorney, Agent, or Firm—Oliff & Berridge

[57] ABSTRACT

An automatic tool changing device in a machine tool for automatically changing a tool at an automatic tool changing (ATC) region. A spindle head is disposed reciprocally movable between a machining region and the ATC region by way of a machine origin which is positioned at a boundary point therebetween. The device includes a control device having a concurrent execution means in which deceleration control to the spindle head toward the machine origin and the acceleration control for the subsequent movement of the spindle head away from the machine origin are taken place in overlapping relation.

5 Claims, 19 Drawing Sheets

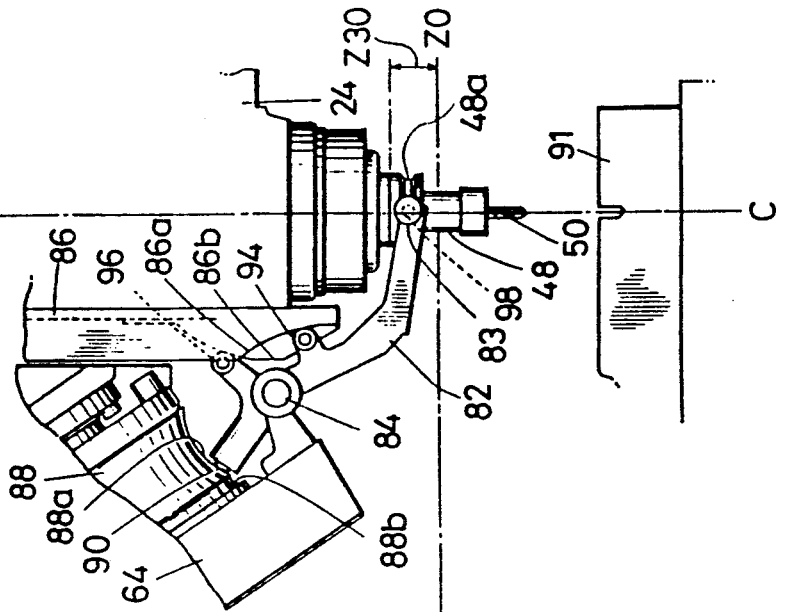
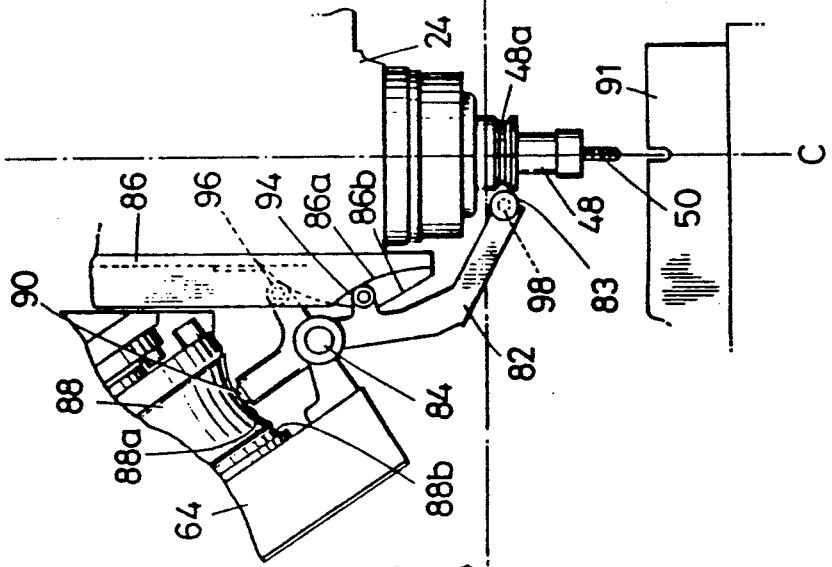
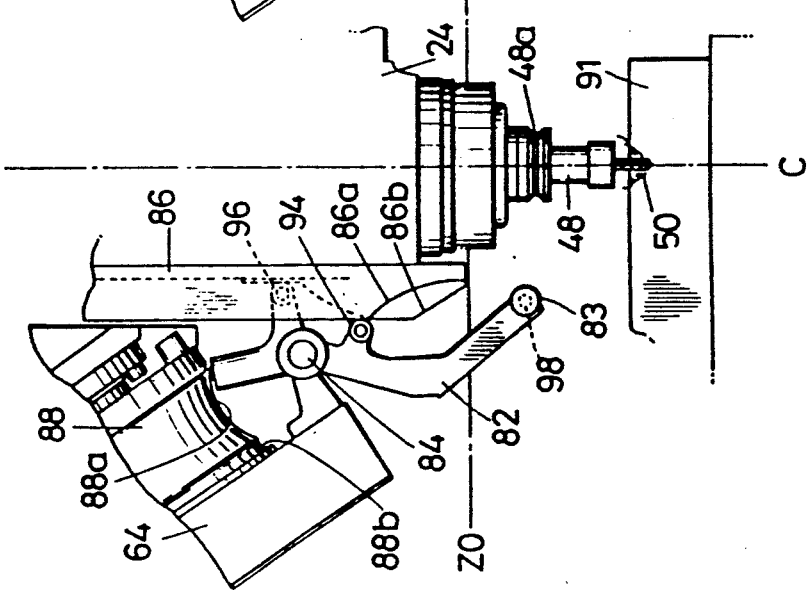

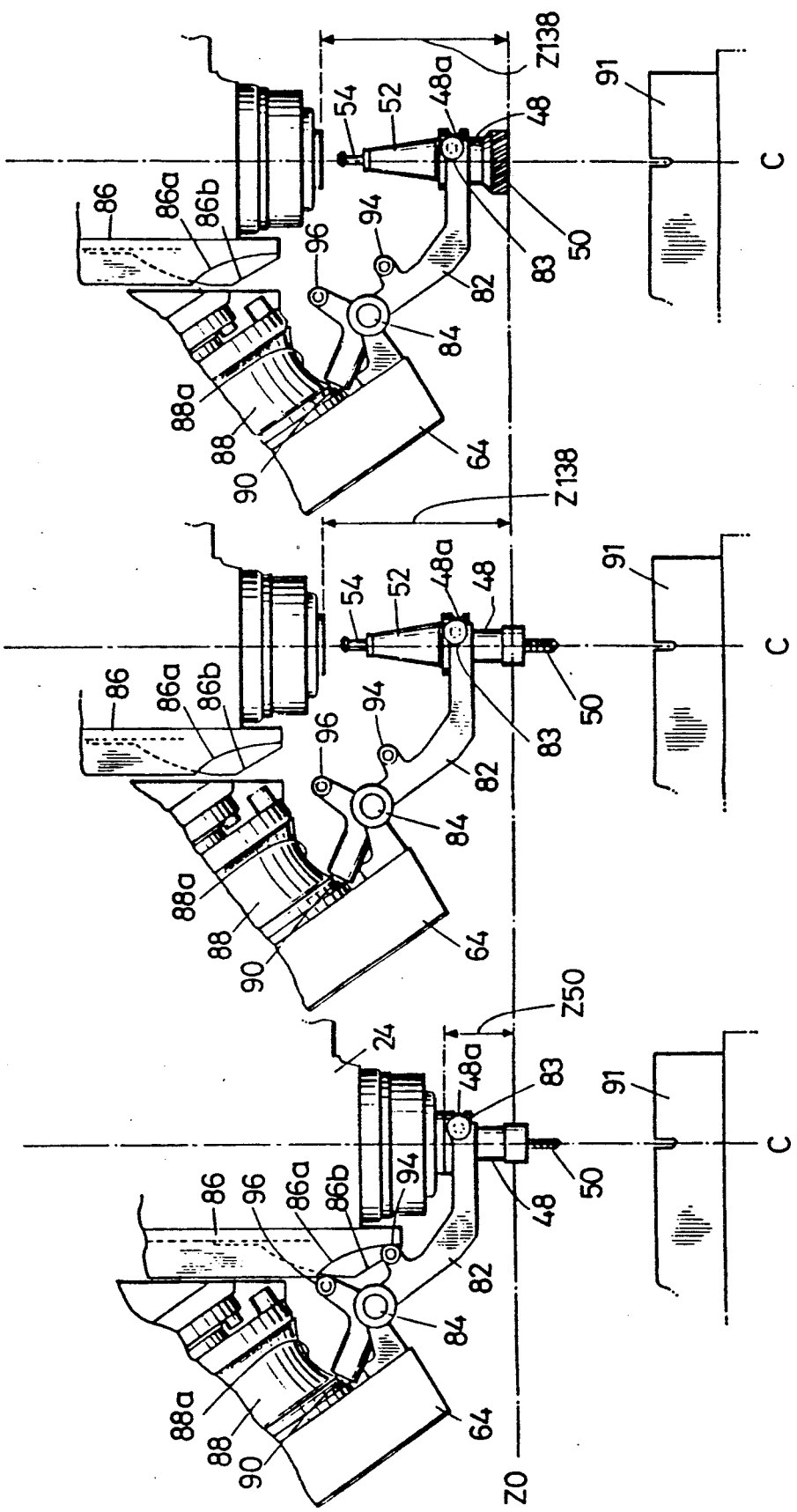

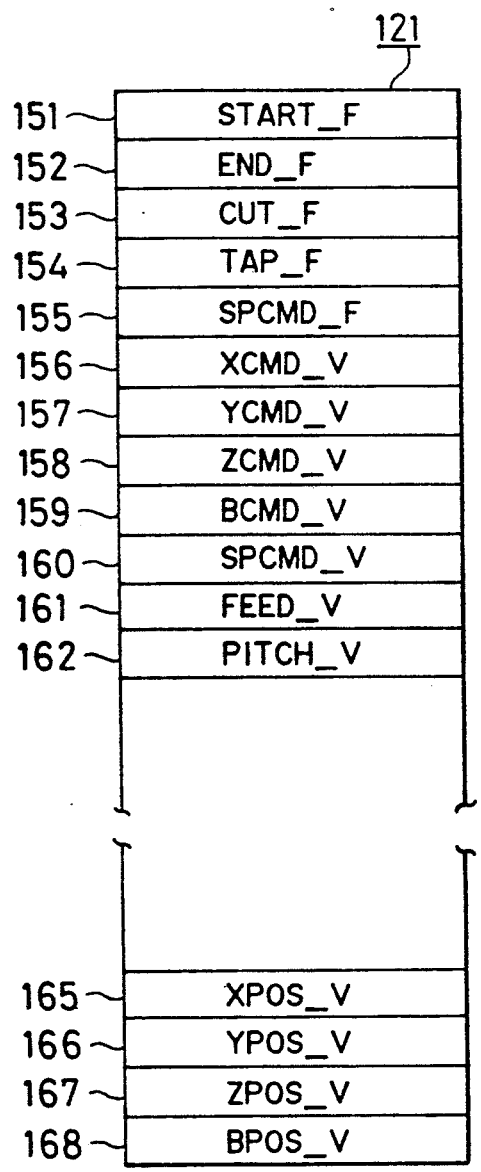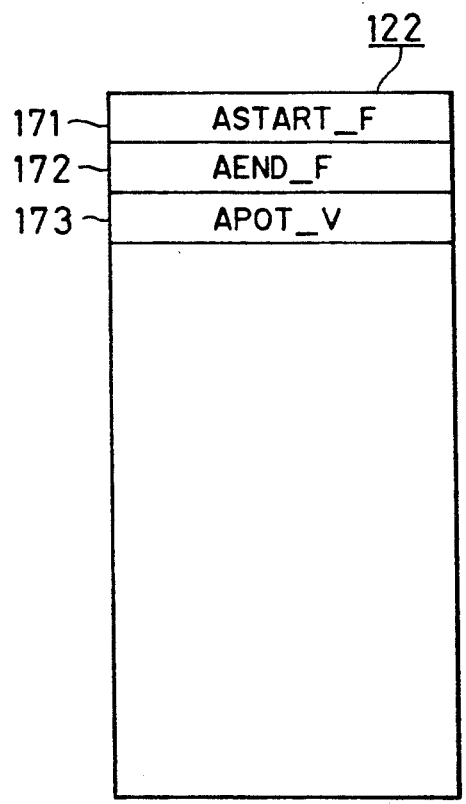
FIG.10
FIG.11

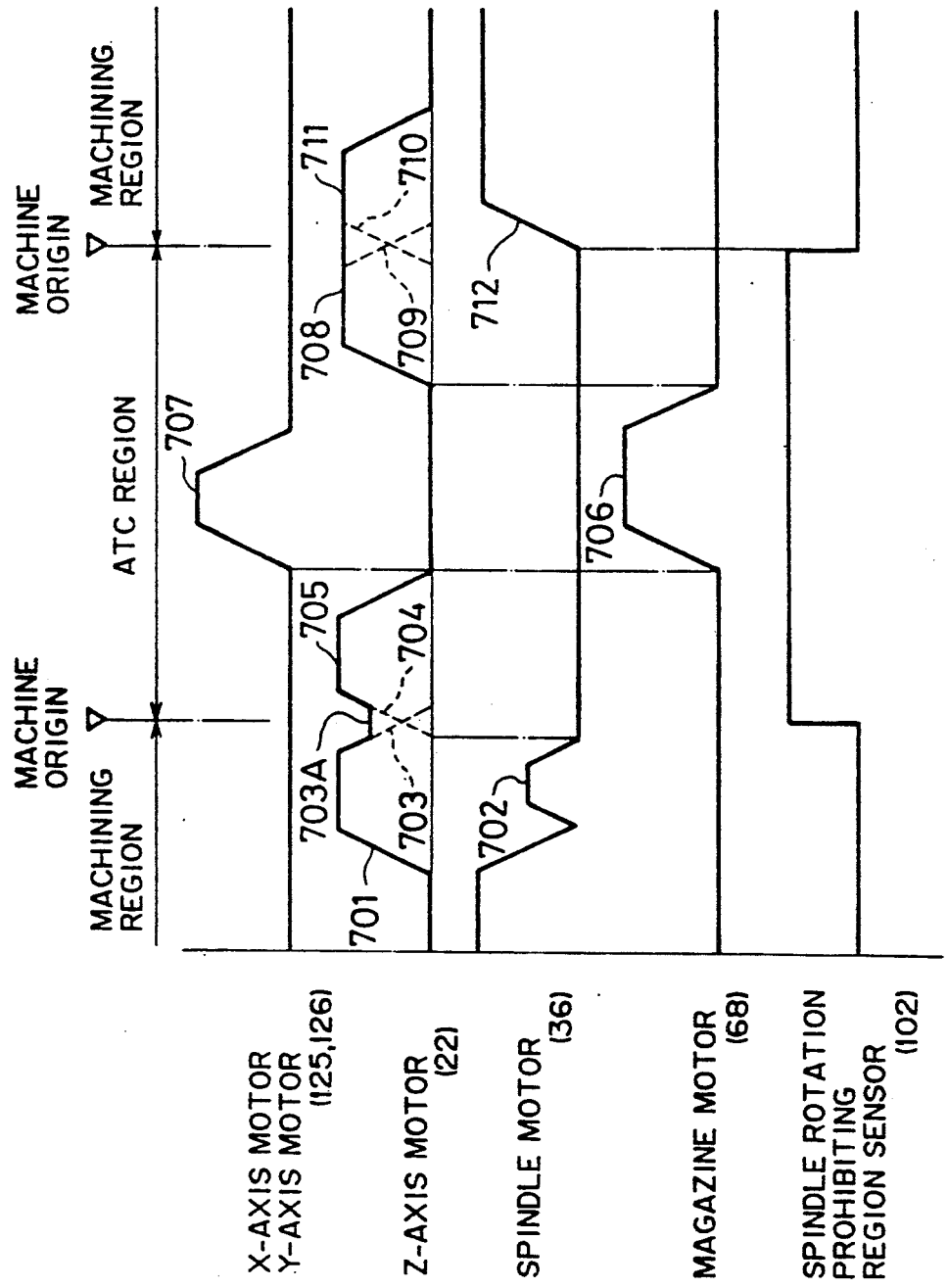

AUTOMATIC TOOL CHANGING DEVICE IN MACHINE TOOL

BACKGROUND OF THE INVENTION

The present invention relates to an automatic tool changing device in a machine tool. More particularly, the invention relates to a type thereof in which a tool assembled to a spindle can be changed with a new tool between a tool magazine and the spindle in accordance with a reciprocating movement of a spindle head.

One example of an automatic tool changing device is disclosed in a Japanese Patent Application Kokai No. 63-267136. According to the conventional device, a cam mechanism is provided for changing a tool with a new tool in synchronism with the ascent and descent motion of a spindle head. This tool changing device provides a machining region where the machining is carried out within the feed range of the spindle head, and an automatic tool change (ATC) region where the actual tool change operation is carried out. In the ATC region, the cam mechanism is operated in accordance with the reciprocal motion of the spindle head to achieve tool changing operation.

In the conventional tool changing device, a machine origin is positively provided between the machining region and the ATC region so as to positively discriminate therebetween in order to prevent the spindle head from being entered into the ATC region during the exact machining. If the spindle head is moved from the machining region to the ATC region and vice versa, the spindle head is temporarily moved to the machine origin (this movement of the spindle head is sometimes referred to as "machine origin restoration"), and thereafter, the spindle head is moved to the other region. So as to perform this temporary restoration, a control device is provided, and a positioning mode is applied when conducting the machine origin restoration.

However, in accordance with the machine origin restoring operation with the positioning mode, the spindle head must be temporarily stopped at the machine origin. Therefore, in case where the tool change is to be conducted with respect to the spindle head positioned on the machining region, the spindle head must be elevated or moved upwardly toward the machine origin, and the moving velocity of the spindle head must be decelerated at a position in the vicinity of the machine origin. The spindle head is then completely stopped at the machine origin, and thereafter, the spindle head is acceleratedly moved upwardly toward the ATC region. Then, tool changing operation is carried out by means of the cam mechanism.

Upon completion of the tool change, the spindle head is moved downwardly toward the machine origin, and is decelerated at a position adjacent thereto, and is then completely stopped at the machine origin. Thereafter, the spindle head is acceleratedly moved downwardly to the previous machining position. For starting the srbsequent machining, the rotation of the spindle is started after the spindle head is temporarily stopped at the machine origin.

Thus, according to the conventional automatic tool changing device, the spindle head must be stopped at the machine origin in an attempt to change the tool with a new tool. Throughout one reciprocal movement of the spindle head between the machining region and the ATC region, twice stops is required in the spindle head. Therefore, entire tool changing period may be prolonged, and accordingly, machining efficiency with respect to a workpiece may be lowered.

SUMMARY OF THE INVENTION

Therefore, it is an object of the invention to provide an improved automatic tool changing device capable of reducing entire tool changing period with a simple arrangement in which the tool changing operation is carried out followed by the displacement of the spindle head.

This and other objects of the invention will be attained by providing an automatic tool changing device in a machine tool, including a frame (12); a spindle head (24) provided to the frame and movable between a machining region and automatic tool changing region; a spindle (40) supported to the spindle head and rotatable about a rotation axis extending in a direction parallel to the reciprocating direction of the spindle head; a tool magazine (66) rotatably supported to the frame and having a plurality of grip portions (82) for holding a tool, the grip portions being arranged on a circumferential locations with respect to a rotation axis of the tool magazine; rotational indexing means (68,78,80,72,74,75) for rotating the tool magazine about its rotation axis and positioning one of the grip portions which holds a tool to a predetermined tool indexing position, tool transfer mechanism (FIG. 5) for permitting the grip portion brought to the predetermined tool indexing position to perform tool transfer operation relative to the spindle in accordance with the movement of the spindle head within the automatic tool changing region; orientation means for stopping rotation of the spindle and positioning the spindle at a predetermined angular position; machine origin restoration means for moving the spindle head positioned at one of the machining region and the automatic tool changing region toward a machine origin (Z0) located at a boundary between the machining region and the automatic tool changing region, and feeding means for feeding the spindle head from the machine origin to one of the automatic tool changing region and the machining region; the !mprovement comprising concurrent execution means (S403, S532) in which deceleration control (703, 709) to the spindle head (24) toward the machine origin (Z0) and the acceleration control (704, 710) for the subsequent movement of the spindle head away from the machine origin by the feeding means (S511, 512, 601, 604) are taken place in overlapping relation.

In one embodiment of this invention in connection with the movement of the spindle head from the machining region to the automatic tool changing region through the machine origin, the concurrent execution means (S403) controls deceleration (703) of the spindle head (24) by the execution of the machine origin restoration means (401,406) at a phase immediately before arrival of the spindle head to the machine origin, and also controls acceleration (704) of the spindle head (24) by the execution of the feeding means (S511, S512,705) at a phase immediately after the departure of the spindle head from the machine origin. The automatic tool changing device is further provided with prohibiting means (S407) for prohibiting execution of the concurrent execution means (S403) if the spindle orientation and the machine origin restoration have not yet been completed.

In another embodiment of this invention in connection with the movement of the spindle head from the automatic tool changing region to the machining region through the machine origin, the concurrent execution means (S532) controls, in response to a termination signal (526) from the rotational indexing means, deceleration (709) of the spindle head (24) by the execution of the machine origin restoration means (S531, S533) at a phase immediately before arrival of the spindle head to the machine origin, and also controls acceleration (710) of the spindle head (24) by the execution of the feeding means (S602, S604,711) at a phase immediately after the departure of the spindle head from the machine origin. The automatic tool changing device is further provided with a detection means (102) for detecting a region where the rotation of the spindle is prohibits within a specific automatic tool changing region, machining start commanding means (602, 603) for previously imparting rotation (712) on the spindle concurrently with the start of execution of the feeding means (S602, S604), and execution prohibiting means (112) for prohibiting execution of the machining start commandings (602,603) as far as the detection means (102) detects the spindle rotation prohibiting region.

According to the present invention, deceleration control to the spindle head toward the machine origin and the acceleration control for the subsequent movement of the spindle away from the machine origin are taken place in overlapping relation. This overlapping relation is provided by rendering the operational mode at the time of the machine origin restoration to be the cutting mode. Since the deceleration control and the acceleration control are taken place simultaneously, the spindle head is moved continuously without any stop at the machine origin, and is smoothly introduced into the intended region. Thus, entire tool changing period can be reduced.

Specifically, according to the first embodiment of this invention, the above described overlapping controls are provided when the spindle head is moved from the machining region to the ATC region. Consequently, a first half period requiring for the tool changing operation can be reduced. In this case, if the spindle orientation has not yet been completed by the spindle orientation means, the overlapping control is prevented by the prohibiting means. Therefore, tool changing operation cannot be started in the ATC region if the tool changing condition is premature.

Further, according to the other embodiment of this invention, the overlapping controls are executed when the spindle head is moved from the ATC region to the machining region. Consequently, a second half period requiring for the tool changing operation can be reduced. In this case, if the spindle head has not yet been completely passed through the spindle rotation prohibiting region, rotation of the spindle is obviated by the execution prohibiting means in connection with the rotation prohibiting region detection means. Therefore, the rotation of the spindle can not be started so far as the grip portion of the tool magazine has not been released from the spindle.

BRIEF DESCRIPTION OF THE DRAWINGS

In the drawings:

FIGS. 7(a) through 7(i) are sequential views illustrative of the tool changing operation and show positional relationship among a spindle head movable in the Z-axis direction, a tool magazine and a grip arm provided at a tool magazine for indexing the tool holder to be utilized;

FIG. 10 shows memory arrangement in a master/slave compatible RAM in the control device;

FIG. 11 shows memory arrangement in a master/ATC compatible RAM in the control device;

FIG. 18 is a timing chart for description of operations in each of components in accordance with the control under the control device of FIG. 9.

DETAILED DESCRIPTION OF THE PREFERRED EMBODIMENTS

An automatic tool changer (ATC) in a machine tool according to the present invention will first be described with respect to the respective constructional details elements or members in conjunction with FIGS. 1 through 8. Most of the components however are also described in U.S. Pat. No. 4,835,838 and German Offenlengsschrift DE 3813929A, which one equivalent.

(1) Spindle Head and Tool Magazine

Figure 1:
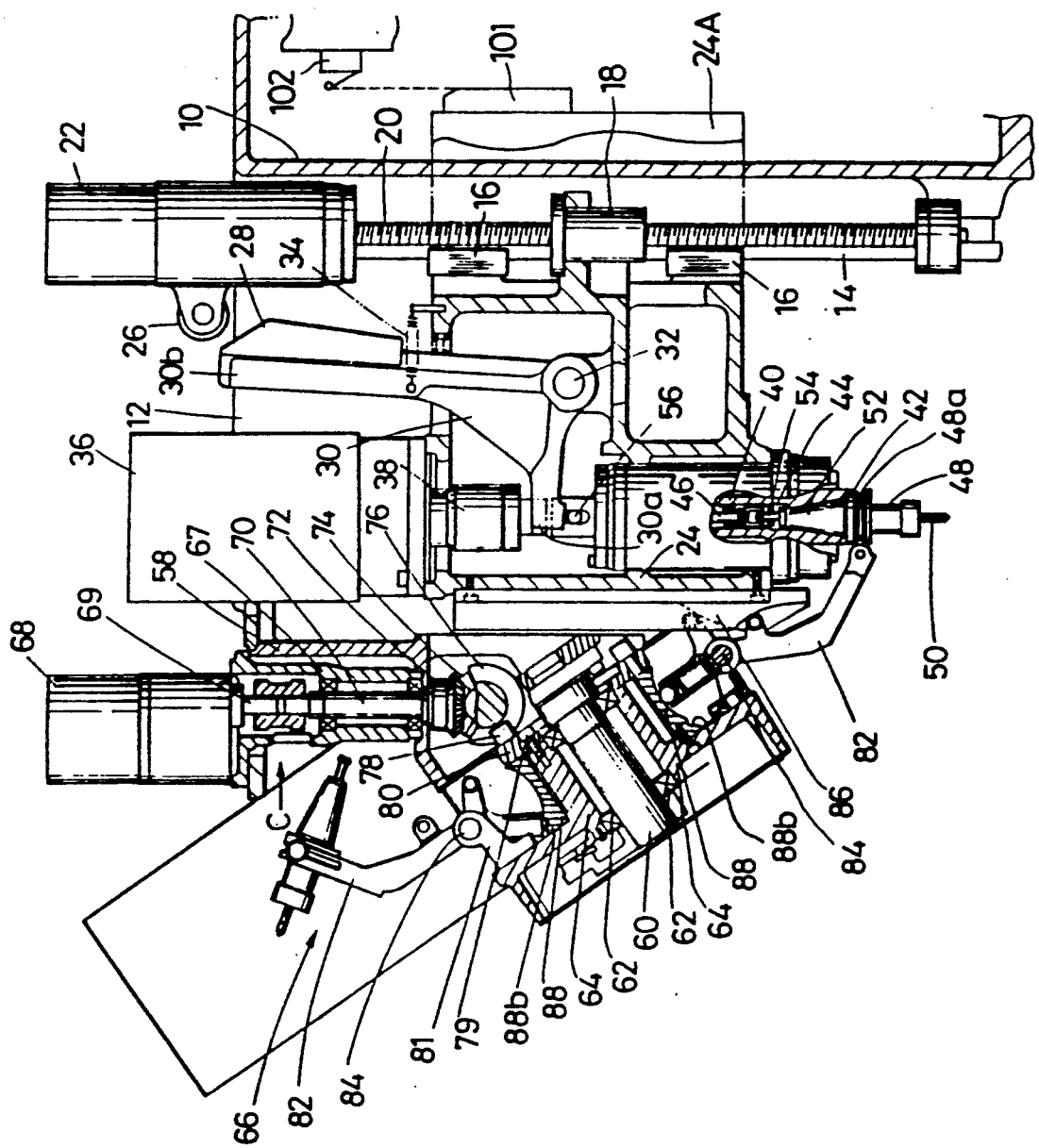
FIG. 1 is a vertical cross-sectional view showing a preferred embodiment of an automatic tool changer of a machine tool according to one embodiment of the present invention.

A machine tool shown in FIG. 1 including an automatic tool changer is generally provided with a vertically extending column 10, a main frame 12 fixedly secured to the column 10, a main spindle head 24 and a tool magazine 66. The main spindle head 24 is provided to the main frame 12 and is movable in the vertical i.e., Z-axis, direction in a reciprocative manner with respect to the main frame 12. The tool magazine 66 is operatively connected to the main frame 12 through a magazine support stand 58 and is adapted to index tool holders 48 accommodated in the tool magazine. A guide rail 14 secured to the frame 12 extends vertically therealong, and the spindle head 24 is secured to the guide rail 14 and is slidable thereon in the Z-axis direction through a pair of linear guides 16, 16. arranged in a vertical alignment. A feed nut 18 is secured at a proper position to the spindle head 24, and a ball screw 20 is rotatably provided about its axis and extends in parallelism with the guide rail 14. The feed nut 18 is threadingly engaged with the rotatable ball screw 20. The ball screw 20 has one end connected to a reversible servo motor(Z-axis motor) 22 disposed above the machine frame 12, whereby the spindle head 24 is movable vertically along the guide rail 14 by the engagement between the ball screw 20 and the feed nut 18.

A spindle 40 extending in vertical direction is rotatably mounted in the spindle head 24, and a tool holding member(a tapered bore) 42 is provided at the lower end portion of the spindle 40. Ihe spindle 40 is connected, through a coupling 38, to an electric motor 36 for driving the spindle 40. The tool holding member 42 has the shape to allow an arbor 52 of the tool holder 48 to be inserted thereinto. The tool holder 48 has its tip portion mounting a tool 50. When the tool holder 48 is inserted into the tool holding member 42, a pull stud 54 of the tool holder 48 is clamped by a holder clamping member 44 disposed in the spindle 40. The clamping of the pull stud 54 is released by pressing the holder clamping member 44 with a draw-bar 46 coaxially disposed in the central hole of the spindle 40, thereby to remove or unclamp the tool holder 48 from the spindle 40.

(2) Tool Holder Clamping and Unclamping Mechanism

A crank lever and a cam mechanism for imparting the swinging movement to the crank lever are incorporated in the automatic tool changer in association with the spindle 40 for clamping the tool holder 48 inserted into the tool holding member 42 and for unclamping the same. To be more specific, a crank lever 30 is swingably pivoted to the spindle head 24 at a proper portion thereof through a pivot shaft 32. The crank lever 30 includes a short lever member 30a and an elongated lever member 30b. The short lever has a free end engageable with a pin 56 projecting from the draw bar 46 and extending in a horizontal direction. The long lever member 30b is provided with a plate cam 28 having a shape shown in FIG. 1.

The plate cam 28 is normally provided abuttable with and movable away from a roll shaped cam follower 26 mounted on a side portion of the Z-axis motor 22 during movement of the cam 28. Further, a tension coil spring 34 is interposed between the long leer member 30b and the spindle head 24 so as to always urge the short lever member 30a to a direction away from the pin 56, so that the pin 56 can be released form the pressing force by the lever member 30 (the spring 34 urges the crank lever 30 in a clockwise direction in FIG. 1).

Upon energization of the Z-axis motor 22, the spindle head 24 is elevated, and on the way to the vertical movement of the spindle head 24, the plate cam 28 attached to the crank lever 30 is abutted with the cam follower 26 located at the stationary position. As a result, the crank lever 30 is pivoted in a direction opposite the urging direction of the coil spring 34, so that the short lever 30a moves downwardly to press the pin 56, and thus, the tool holder clamping member 44 is urged through the draw bar 46, and then the clamping force of the tool holder 48 against the pull stud 54 can be released.

(3) Rotationary Indexable Mechanism in Tool Magazine

As shown in FIG. 1, a support shaft 60 is secured to the tool magazine support stand 58 secured to the machine frame 12. The support shaft 60 is oriented obliquely downwardly and is positioned adjacent to a spindle head movable zone. A magazine base 64 having a configuration as shown is provided rotatable about the support shaft 60 through bearing means 62. Further, a plurality of grip arms 82 serving as tool holder holding means, descried in detail hereinafter are arranged in radial directions with predetermined angular positions and are provided pivotable with respect to the magazine base 64. An indexing disc 80 is fixed to the magazine base 64 by bolts 79. The disc 80 is formed with a central bore fitted with the support shaft 60. A plurality of cam follower 78 (ten followers in the illustrated embodiment) each in a roller form are disposed on one face of the indexing disc 80 at portions corresponding to the location of grip arms 82 describe in detail hereinafter.

Figure 6:
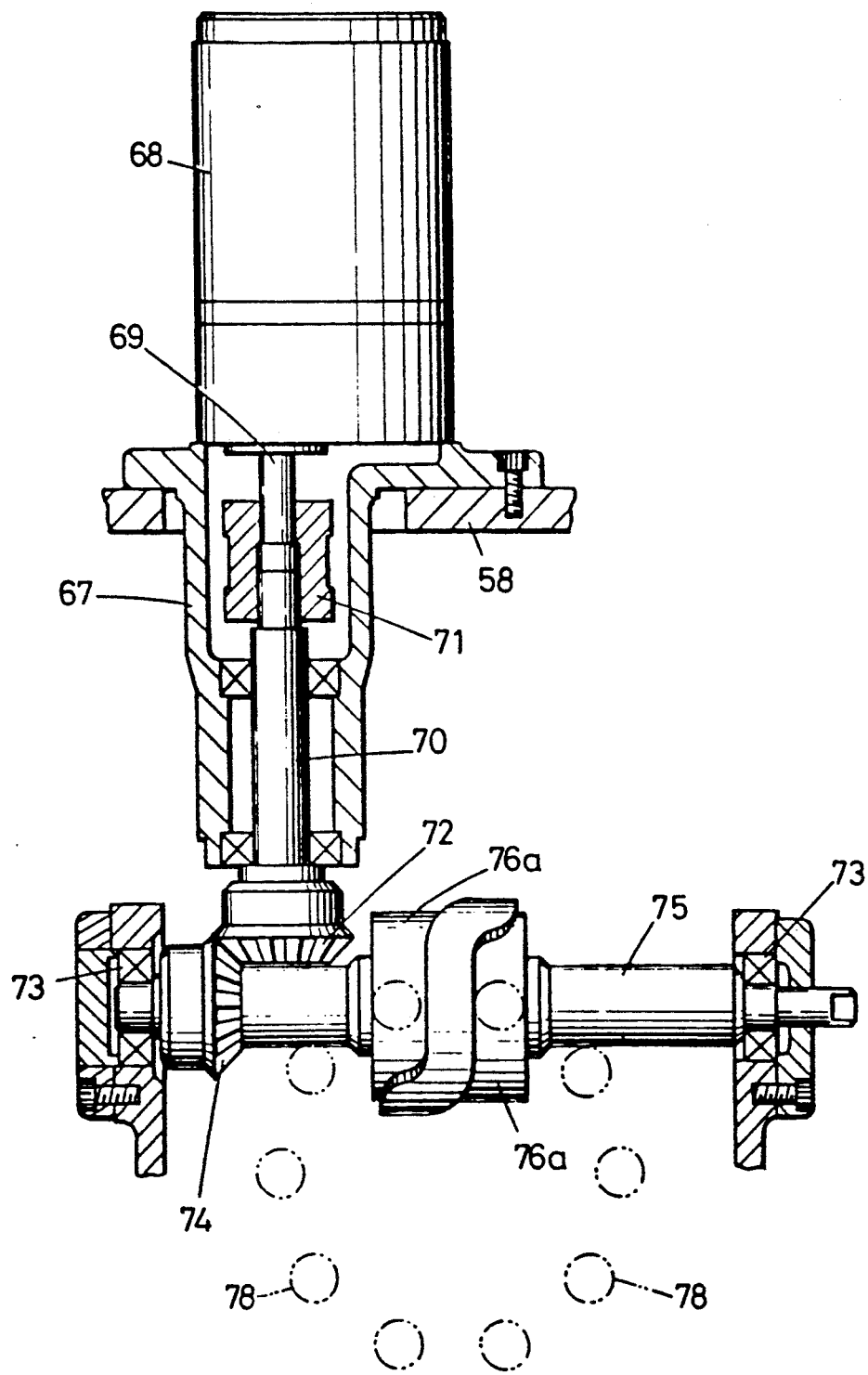
FIG. 6 is a view showing a tool magazine indexing mechanism associated with the automatic tool changer shown in FIG. 1 as viewed from an arrow C in FIG. 1.

As shown in FIG. 1 and FIG. 6 viewed from an arrow C direction in FIG. 1, an indexing motor or a magazine motor 68 is inversely disposed on an upper portion of a casing 67 which vertically extends on the magazine support stand 58. A drive shaft 70 extends through the casing 67, and has one end connected to a motor shaft 69, and has another end fixed with a bevel gear 72. The bevel gear 72 is in meshing engagement with a bevel gear 74 provided at a rotating shaft 75 horizontally extending through bearing means 73. A barrel cam 76 formed with a curved cam groove 76a on its outer peripheral surface is mounted on the rotating shaft 75, so that the cam followers 78 radially arranged on the indexing disc 80 are successively fitted with the cam groove 76a, when operated, to thereby impart the intermittent indexing rotation to the indexing disc 80 in response to the rotation of the barrel cam 76 about the support shaft 60.

(4) Tool Transferring Mechanism

Next, will be described with reference to FIGS. 2 to 4 a details of the grip arm 82 which is subjected to positional indexing by the rotational indexing mechanism, and a swinging mechanism for swinging the grip arm for transferring the tool holder 48.

A plurality of clevises 81 (ten clevise in the illustrated embodiment) are provided on the magazine base 64, which constitutes one of the ccmponents of the tool magazine 64, in the circumferential directions, with respect to the support shaft 60, at predetermined spaces from each other. The respective clevises 81 swingably pivot grip arms 82 (grip portions) each having a configuration as shown, through pivot pins 84, respectively, so as to direct the free ends of the grip arms 82 radially outwardly.

Figure 3:
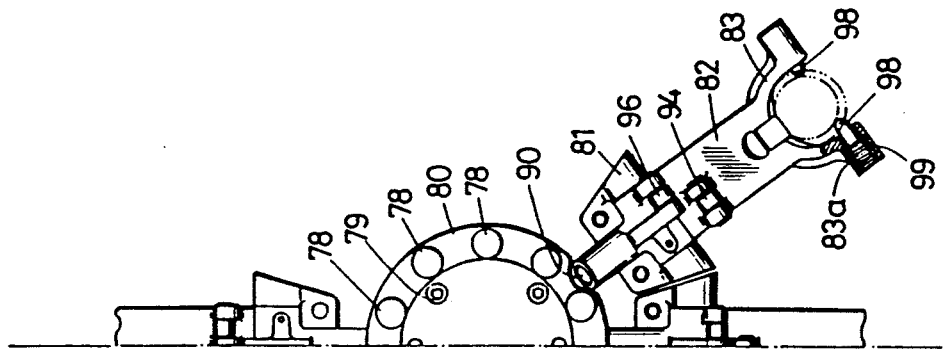
FIG. 3 is a view of the tool magazine as viewed from an arrow A in FIG. 2.
Figure 4:
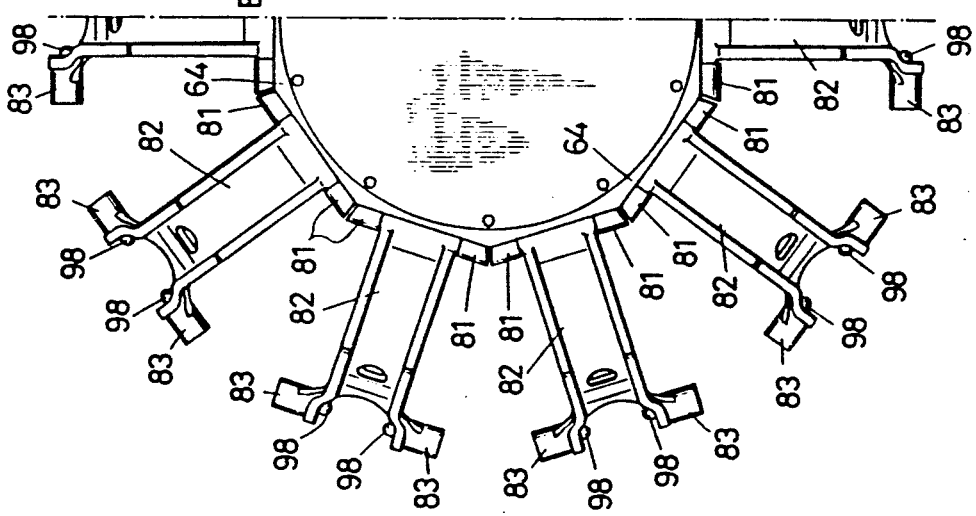
FIG. 4 is a view of the tool magazine as viewed from an arrow B in FIG. 3.

Each of the free ends of the grip arm or the grip portions 82 is, as best shown in FIG. 3, provided with a bifurcated portion 83 having dimensions capable of holding a gripped portion of the tool holder 48. Each of the gripped portions of the tool holders 48 is formed with a V-shaped groove 48a. Blind bores 83a are formed in the inner portions of the respective bifurcated portion 83. Compression coil springs 99 are accommodated in the respective blind bores 83a. Further, support pins 98 are retractably inserted into the bores 83a. The support pins 98 are biased by the compression coil springs 99 so that the front free ends of the pins 98 direct inwardly of the bifurcated portion 83 to oppose to each other in a linearly aligned manner.

When the V-shaped groove portion 48a of the gripped portion of the tool holder 48 is fitted with the bifurcated portion 83 of the grip arm 82, the support pins 98 abut against the V-shaped groove 48a and are engaged therewith. The tool holder 48 is supported by the support pins 98 which are retraced into the blind holes 83a against the biasing force of the coil springs 99.

Figure 2:
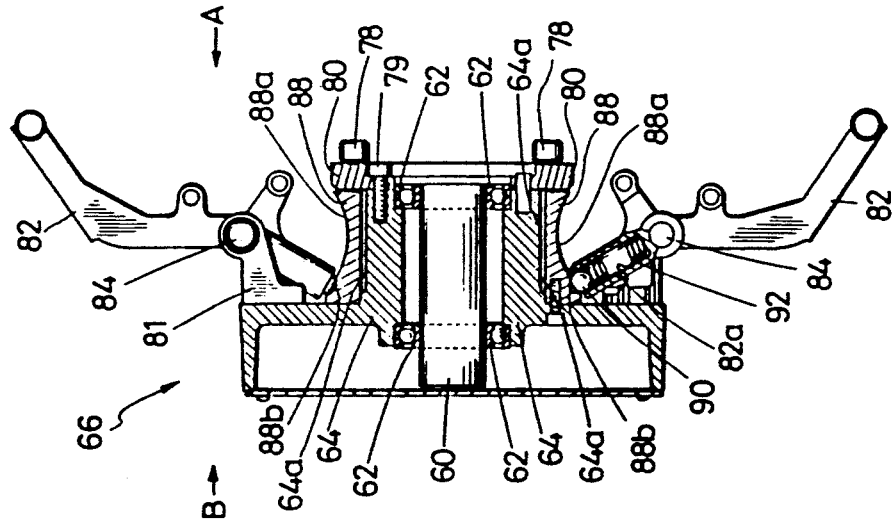
FIG. 2 is a vertical cross-sectional view showing an essential portion in a tool magazine of the machine tool shown in FIG. 1.
Figure 5:
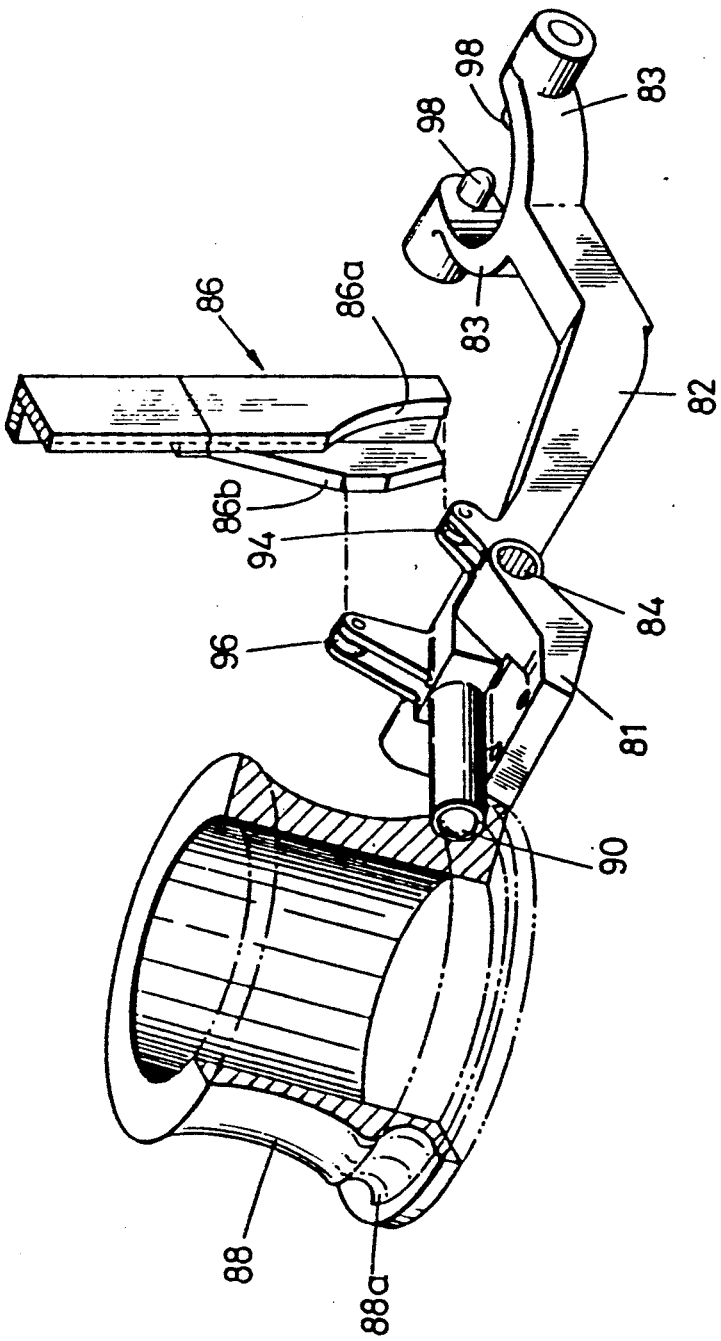
FIG. 5 is a perspective exploded view showing a tool holder grip arm and associated members of the automatic tool changer shown in FIG. 1.

Further, as shown in FIG. 2, grip arm 82 has another end portion in which is formed another blind bore 82a in which a compression coil spring 92 and a steel ball 90 are resiliently accommodated in a state that a portion of the steel ball projects out of an open end of the blind bore 82a. As shown in FIG. 2, the magazine base 64 is provided with a boss 64a on which a grip support collar 88 is mounted. The grip support collar 88 has an outer peripheral surface at which a guide surface 88a having an arcuate cross-section is provided. The steel ball 90 disposed in the blind bore 82a of the grip arm 82 resiliently abuts against the arcuate guide surface 88a. A notched groove 88b is formed in the guide surface 88a on the side near the magazine bases 64 as shown in FIG. 5. The grip arm 82 is settled at its stand-by position for, the tool indexing operation by fitting the steel ball 90 into the notch groove 88b.

As shown in FIG. 5, first and second cam followers 94 and 96 each in roller shape are supported to be rotatable at bilateral locations with respect to the center line of the grip arm 82, and at the longitudinally front and rear portions of the grip arm 82 with respect to the pivot pin 84. The first and second cam followers 94 and 96 are constructed so as to slidably abut against and move away from the first and second cam surfaces 86a and 86b formed in a composite cam member 86 shown in FIGS. 1 and 5. More specifically, as shown in FIG. 1, the composite cam member 86 is secured by bolts to the vertical surface of the spindle head 24, and confronts the tool magazine 66, so that the first and second cam surfaces 86a and 86b are in confrontation with the side of the indexing position of the desired tool holder 48 in the tool magazine 66 (i.e. these cam surfaces are positioned near the grip arm 82 indexed correspondingly to the tool holding member 42 of the spindle 40).

The first and second cam followers 94 and 96 those provided at the grip arm 82 are positioned so as to slidingly contact with the first and second cam surfaces 86a and 86b of the composite cam plate 86 respectively correspondingly in the vertically movable area of the spindle head 24, which area includes a vertically original point Z0 as will be described hereinafter with reference to FIGS. 7(a) to 7(d), FIGS. 7(g) to 7(i) and FIG. 8. When the spindle head 24 is moved vertically in the Z-axis direction, the first and second cam followers 94 and 96 are brought into abutment with the first and second cam surfaces 86a and 86b, respectively, under the condition described later, whereby the grip arm 82 can be swingably moved in the predetermined manner about the pivot pin 84 in accordance with the curvatures of the cam surfaces 86a and 86b. In this state, the steel ball 90 disposed in the another end of the grip arm 82 is disengaged from the notched groove 88b circumferentially formed on the grip support collar 88, and is moved along the arcuate guide surface 88a.

(5) Detection means for Detecting Region Where Spindle Rotation is Prohibited:

As shown in FIG. 1, the spindle head 24 has a rear protruded portion 24A to which a dog 101 is fixedly secured. Further, a column 102 is provided on which a limit switch 102 is fixed. This limit switch 102 is adapted to detect the position of the spindle head 24 when the latter is brought to the automatic tool changing (ATC) region where rotation of the spindle is prohibited If the spindle head 24 is moved upwardly from the machine origin Z0 by a distance exceeding a predetermined distance, such as not less than 5 mm, the dog 101 continuously depresses the limit switch 102. In this connection, the dog 101 has a suitable configuration in order to smoothly abut the limit switch 102 when the dog is moved upwardly.

(6) Tool Changing Operation by Cam Mechanism

The preferred embodiment of the automatic tool changer having construction described above will be operated in accordance with a manner illustrated in FIGS. 7(a) through 7(i) and FIG. 8 for automatically changing the tool.

The spindle head 24 and the composite cam member 86 fixed thereto are moved vertically in the Z-axis direction because of the thread-engagement between the nut 18 secured to the spindle head 24 and the rotating ball screw 20 by the rotation of the servo motor 22. However, the vertical position of the tool magazine 66 is unchanged, and the magazine 66 is positioned at a predetermined portion of the main frame 12, while the magazine base 64 in the tool magazine 66 is rotated by the rotation of the indexing motor 68 to index the toll holders 48 held by the respective grip arms 82.

Accordingly, in the states of the automatic tool changer shown in FIGS. 7(a) to 7(i), the machine origin Z0 point as a reference operational position of the spindle head 24 is defined. A position below the machine origin Z0 defines a machining region where the main spindle head 24 executes machining to a workpiece. On the other hand, a position above the machine origin Z0 defines the automatic tool changing region (ATC region) where the spindle head 24 undergoes tool replacement. Further, FIG. 8 shows a time chart representing the operations of the respective components of the automatic tool changer in connection with the illustrated states in FIGS. 7(a) to 7(i). In FIG. 8, an ordinate represents a stoke position (Z-axis position) of the spindle head 24, whereas an abscissa represents a time.

FIG. 7(a) shows a conditions of a machine tool according to this invention where the workpiece 91 is subjected to machining. In this state, the lower end of the spindle 40 of the spindle head 24 is positioned at a position lower than the machine origin Z0. In this case, the first cam follower 94 provided at the grip arm j82 is positioned at the uppermost portion of the corresponding first cam surface 86a of the composite cam member 86, while the second cam follower 96 is positioned at the lowermost portion of the corresponding second cam surface 86b. Therefore, the bifurcated portion 83 of the grip arm 82 is positioned at a position the most spaced apart from the specific tool holder 48 mounted in the tool holding member 42 of the spindle 40. According to this positional arrangement, the spindle head 24 is solely movable to its descent position towards the workpiece 91 to carry out the predetermined cutting operation without being interfered with the tool magazne 66.

FIG. 7(b) represents the condition in which the spindle head 24 is moved upwardly to a portion at which the lower end of the spindle 40 is positioned at substantially the same level as the level of the machine origin Z0. In this condition, the orientation (i.e. positioning at a given position) of the spindle 40 has been terminated, and the first cam follower 94 of the grip arm 82 is positioned at the intermediate portion of the first cam surface 86a while the second cam follower 96 is positioned at the intermediate portion of the second cam surface 86b to move the grip arm 82 toward the tool holder 48, thereby to slightly swing the grip arm 82 about the pivot pin 84 in the counterclockwise direction in FIG. 7.

Therefore, the paired support pins 98, as shown in FIG. 3, provided in the bifurcated portion 83 of the grip arm 82 are closely positioned adjacent the V-shaped groove 48a orienting in a horizonlal direction and circumferentially formed in the maximum diameter portion of the tool holder 48. At this time, the support pins 98 have not yet engaged with the V-shaped groove 48a, thus capable of carrying out the cutting operation to the workpiece 91 by the tool 50. The first and second cam surfaces 86a and 86b are so designed that the support pins 98 can follow up the vertical displacement of the V-shaped groove 48a of the tool holder 48 up to the time when the tool gripping operation has been completed as represented by the condition of FIG. 7(d).

FIG. 7(c) shows the next step in which the spindle head 24 is elevated by the distance, for example, designated by reference numeral Z=30 above the machine origin Z0 for changing the tool holder 48. That is, the spindle head 24 enters the ATC region. During the elevating motion of the spindle head 24 to this level, the dog 101 provided at the rear portion of the spindle head 24 kicks the limit switch 102, and the latter is continuously depressed. Therefore, the limit switch 102 continuously outputs the detection signals indicative of the entry of the spindle head 24 into the spindle rotation prohibiting region.

Further, during the elevating movement of the spindle head 24, the plate cam 28 of the crank lever 30 comes into contact to and engages with the cam follower 26, and the crank lever 30 starts to be rotated in counterclockwise direction in FIG. 1 against the biasing force of the tension coil spring 34. Further, the first and second cam surfaces 86a and 86b of the composite cam member 86 urge the corresponding first and second cam followers 94 and 96 respectively in accordance with the elevating motion of the spindle head 24 over the level of the machine origin Z0. Therefore, the grip arm 82 is further plvoted in the counterclockwise direction.

Under this condition, the support pins 98 of the bifurcated portion 83 of the grip arm 82 are aligned with the V-shaped groove 48a of the tool holder 48 and moved in the follow-up manner, and the support pins 98 are then retracted against the biasing force of the springs 99 and are positioned of the center line C of the spindle 40. At this time, the short lever member 30a of the crank lever 30 starts to lease the clamping of the holder clamping member 44 with respect to the pull stud 54 of the tool holder 48.

In the next step, FIG. 7(d) shows the state in which the spindle head 24 is elevated by the distance designated by reference numeral Z0=50. As is apparent from the time chart shown in FIG. 8, just before arriving at this elevated condition, the crank lever 30 has been completely swung, and the holder clamping member 44 releases the pull stud 54, thus finishing the unclamped condition of the tool holder 48. The grip arm 82 is further swung in the counterclockwise direction (FIG. 7) under the engagement between the first and second cam surfaces 86a and 86b and the corresponding first and second cam followers 94 and 96, whereby the steel ball 90 in the grip arm 82 is stably rested in the notched groove 88b of the grip support collar 88. Under this condition, the support pins 98 completely hold the V-shaped groove 48a of the tool holder 48, thus chucking the tool holder 48 by means of the grip arm 82. Under this condition, the draw-out of the tool holder 48 from the spindle head 24 is started.

FIG. 7(e) shows a state where the spindle head 24 is moved upwardly by a distance of Z=138 from the machine origin Z0. In accordance with the elevation of the spindle head 24 from the position shown in FIG. 7(b), the tool holder 48 secured to the spindle 40 is held by the grip arm 82 and remains intact in the grip arm 82. In the step shown in FIG. 7(e), the tool holder 48 is removed from the spindle, to thereby complete tool transfer from the spindle head 24 to the tool magazine 66. At the spindle head elevated position (Z=138), the magazine motor 68 is rotated to rotatingly index the indexing disc 80 under the operative engagement between the barrel cam 76 and the cam follower 78.

FIG. 7(f) shows a state where another grip arm 82 holding another tool holder 48 to be used for the next machining is positioned directly below the tool holding member 42 of the spindle head 24 where the new tool holder 48 is brought into alignment with the line C.

Next, described will be the newly indexed tool holder 48 engageable with the tool holding member 42 of the spindle 40. The new assembly to the spindle 40 is carried out by the reversal rotation of the Z-axis motor 22 and the descent motion of the spindle head 24.

Figures 7G, 7H, 7I:
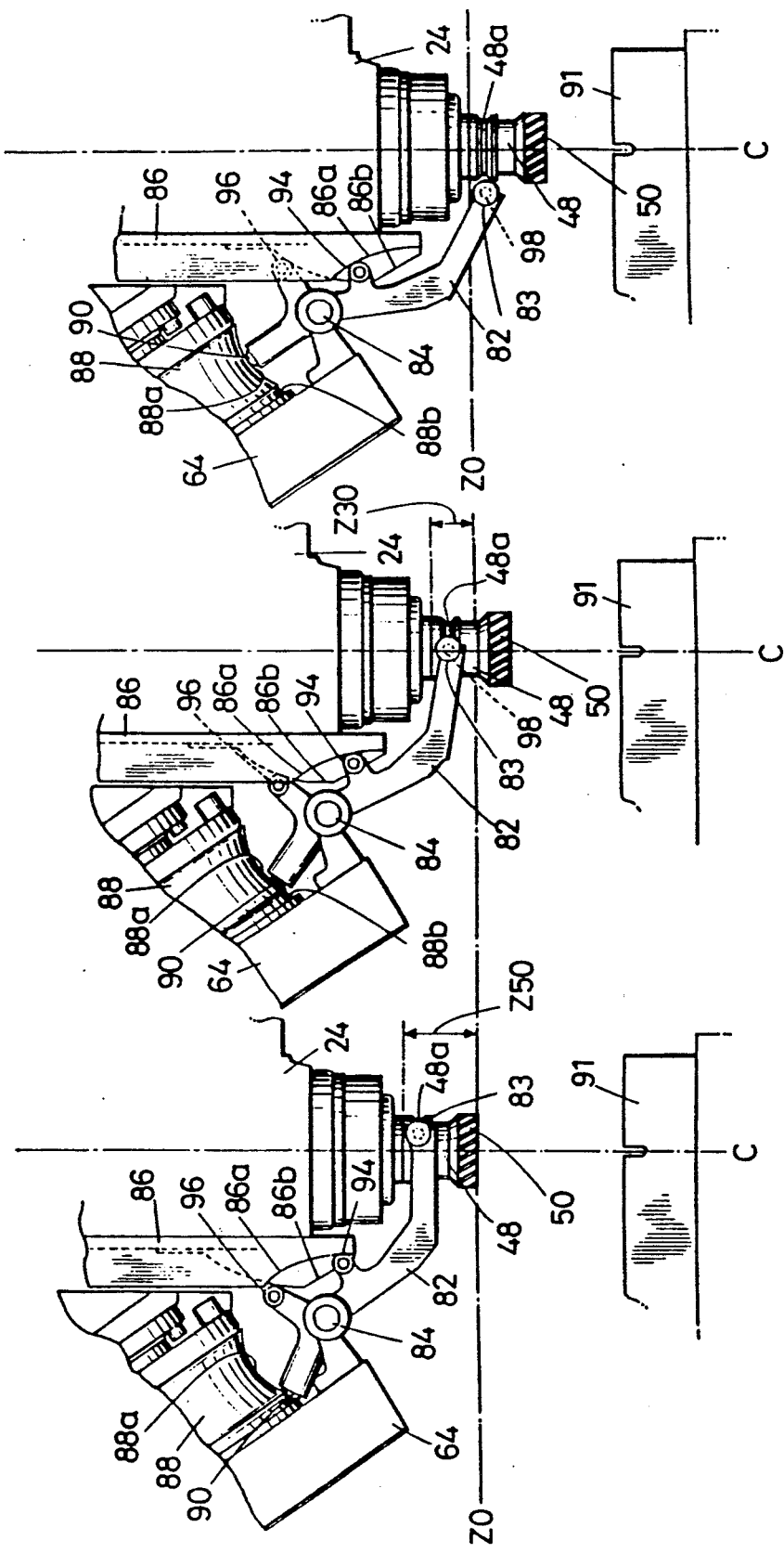
Figure 8:
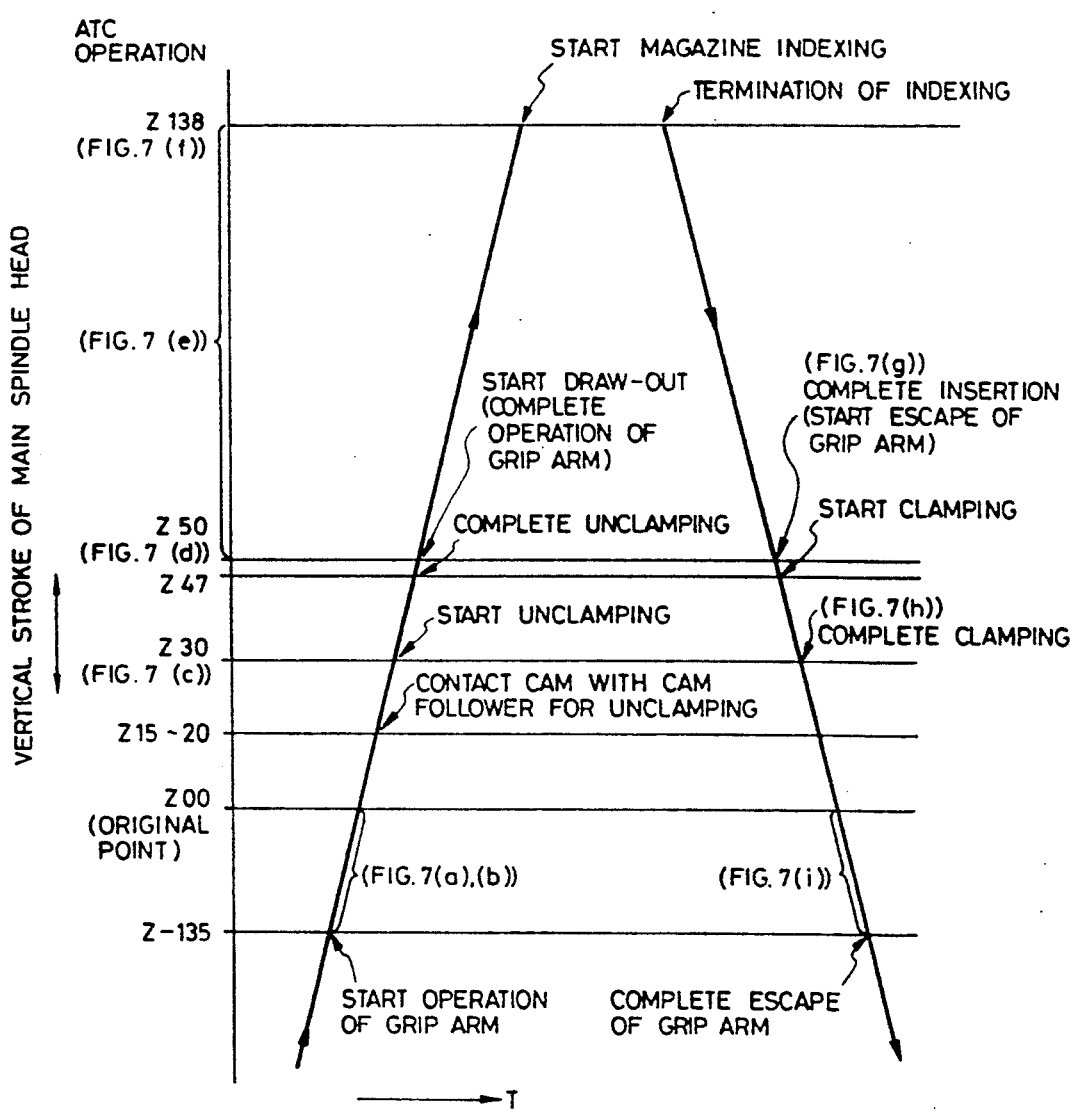
FIG. 8 shows a time chart illustrative of the operations of the respective members in accordance with the movement of the spindle head in the elapsed time.

FIG. 7(g) shows a state where the spindle head 24 is lowered to a position spaced away from the machine origin Z0 by a distance of Z=50. According to the lowering of the spindle head 24, the arbor 52 of the newly indexed tool holder 48 is inserted into the tool holder holding member 42. The first and second cam followers 94 and 96 are spaced away from the corresponding first and second cam surfaces 86a and 86b of the composite cam member 86 in the states shown in FIGS. 7(e) and 7(f). However, the cam followers 94 and 96 are again coming into contact with the corresponding cam surfaces 86a and 86b respectively to start the escape movement of the grip arm 82 relative to the tool holder 48. That is, the grip arm 82 starts pivotal movement about the pivot pin 84 in the clockwise direction (FIG. 7), and the pins 98 in the bifurcated portion 83 of the grip arm 82 follow up the movement of the V-shaped groove 48a formed circumferentially in the tool holder 48.

When the spindle head 24 is lowered to the distance designated by the reference numeral Z=47, the plate cam 28 in engagement with the cam follower 26 for swinging the crank lever 30 in the counterclockwise direction (FIG. 1) begins to move away from the cam follower 26 for clamping the pull stud 54 of the tool holder 48 by means of the holder clamping member 44.

In FIG. 7(h), when the spindle head 24 is further lowered near to thc position designated by Z=30 with respect to the machine origin Z0, the plate cam 28 of the crank lever 30k is completely disengaged from the cam follower 26, so that the clamping operation of the holder clamping member 44 with respect to pull stud 54 has been completed. Further, the steel ball 90 located in the tip end portion of the grip arm 82 is disengaged from the notched groove 88b of the grip support collar 88, and grip arm 82 is swung in clockwise direction (FIG. 7) because of the associated engagements between the cam followers 94 and 96 and the corresponding cam surfaces 86a and 86b.

FIG. 7(i) shows a state where the spindle head 24 is further lowered and reaches the machine origin Z0. Immediately before the arrival of the spindle head 24 to the machine origin, the dog 101 provided at the rear portion of the spindle head 24 is separated from the limit switch 102. Therefore, the detection signal is not any more generated. Accordingly, it is affirmed that the spindle head 24 is moved out of the rotation prohibiting region. At the machine origin Z=0, the grip arm 82 is completely separated from the tool holder 48 insertedly held by the tool holding member 42 of the spindle 40.

If the spindle head 24 is further moved downwardly from the machine origin Z0, the grip arm 82 is further moved away from the tool holder 48, as shown in FIG. 7(a), thus enabling the sole lowering of the spindle head 24 with respect to the workpiece 91.

(7) Control Device

Figure 9:
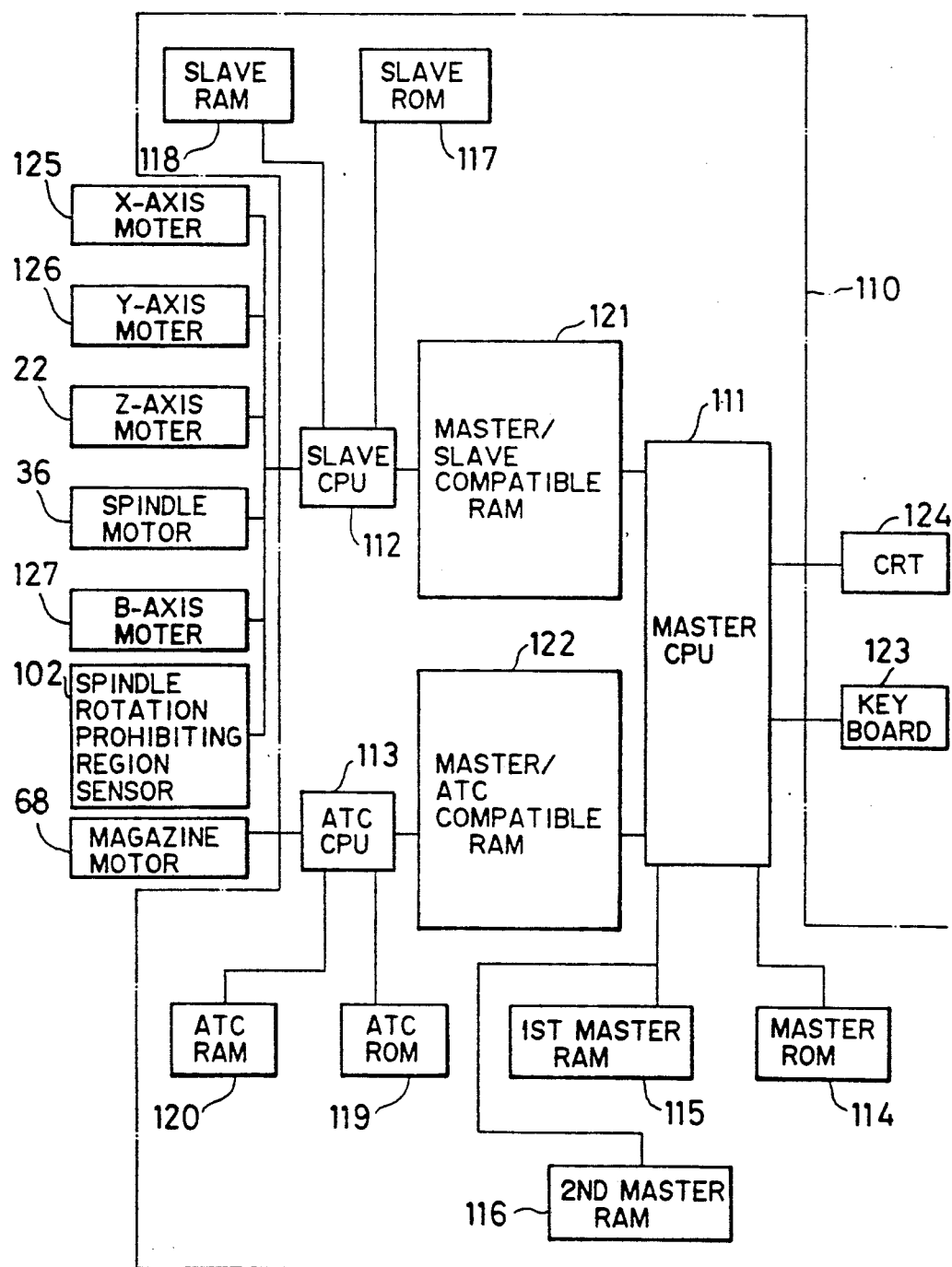
FIG. 9 is a block diagram showing a control device and electrical connections thereto according to one embodiment of this invention.

FIG. 9 shows a block diagram showing a control device for controlling the machine tool provided with the automatic tool changing device according to the above described embodiment. A control device 110 is provided with a computer which primarily includes three CPUs, i.e., a master CPU 111 for governing overall control, a slave CPU 112 for mainly serving machining to the workpiece, and ATC CPU 113 for mainly serving tool changing operation.

Connected to the master CPU 111 are a master ROM 114 in which stored are a program for operating the control device itself and constant values, a first master RAM 115 for temporarily storing variables and flags during processing, and a second master RAM 116 for storing a tool changing timing and a machining program in order to select a proper tool with respect to a workpiece. The second master RAM 116 is backuped even by the shut off of the electrical power supply.

Connected to the slave CPU 112 are a slave ROM 117 in which stored are motor driving program for machining to the workpiece and constant values, and a slave RAM 118 which temporarily stores therein variables and flags during the control to the machining to the workpiece. Further, connected to the ATC CPU 113 are ATC ROM 119 in which stored are magazine rotation program and constant values for the tool change and a ATC RAM 120 which temporarily stores therein variables and flags for the tool change control program.

A master/slave compatible RAM (M/S RAM) 121 is connected between the master CPU 111 and the slave CPU 112 for data or signal communications therebetween. For example, the master CPU 111 sends instruction to the slave CPU 112, or the signal from the slave CPU 112 is sent to the master CPU 111. Data or informations from the master CPU 111 and from the slave CPU 112 are written into the MS RAM 121, or such data or informations are read out therefrom.

Further, a master/ATC compatible RAM (M/A RAM) 122 is connected between the master CFU 111 and the ATC CPU 113 for data or signal communication therebetween. For example, the master CPU 111 sends instruction to the ATC CPU, or the signal from the ATC CPU 113 is sent to the master CPU 111 through the M/A RAM 122. Similar to the M/S RAM 121, data or informations from the master CPU 111 and from the ATC CPU 113 are written into the M/A RAM 122, and such data or information are read out therefrom.

The master CPU 111 is also connected to a key board 123 for making and inputting machining program, and to a CRT 124 which can display the machining program.

The slave CPU 112 is connected to a X-axis motor 125 for moving a work table (not shown) in X-direction, a Y-axis motor 126 for moving the work table in Y-direction, a B-axis motor 127 for rotating the work table, the above described Z-axis motor 22 for vertically moving the spindle head 24, and the spindle motor 36 for rotating the spindle 40. The slave CPU 112 is adapted for controlledly driving these motors so as to execute a machining with a predetermined tool with respect to the workpiece mounted on the work table. The slave CPU 112 is also connected to the limit switch 102 (described as a sensor in FIG. 9) which detects the spindle rotation prohibiting region, to thereby notify that the spindle head 24 is brought to a position above the machine origin Z0, i.e, the spindle rotation prohibiting region.

On the other hand, the ATC CPU 113 is connected to the magazine motor 68. The magazine motor 68 is controlledly driven by the ATC CPU 113 for rotating the tool magazine 66 in order to perform rotational indexing the subsequently employable tool.

FIG. 10 shows a memory arrangement in the M/S RAM 121 through which information in the master CPU 111 are transmitted to the slave CPU 112 and vice versa. Memory locations 151 through 155 contains various flags, and memory locations 156 through 162 store instruction data to be transmitted from the master CPU 111 to the slave CPU 112. Further, memory locations 165 through 168 store data to be transmitted from the slave CPU 112 to the master CPU 111.

More specifically, the memory location 151 contains execution start flag "START_F" for instructing a start of operation. If the flag 151 is set to "1" by the master CPU 111, the slave CPU 112 will start operational execution with reference to other informations.

The memory location 152 contains execution end flag "END_F" for notifying completion of the operation. If the operation started by the execution start flag "START_F" is terminated, the flag 152 is set to "1" by the slave CPU 112, so that the master CPU 111 can notify the operational termination.

The memory location 153 contains a cutting mode flag "CUT_F". If the flag 153 is set to "1" by the master CPU 111, a cutting mode (G01) is provided with respect to the table feed, whereas if the flag 153 is set to "0" by the master CPU 111, a positioning mode (G00) is provided. In the positioning mode G00, the slave CPU 112 sets the above described execution end flag "EN-D_F" 152, after the table G01, the slave CPU 112 sets the execution end flag "END_" 152, when the deceleration of the table feed is started thereby allowing the next table feed.

The memory location 154 contains a tapping flag "TAP F". At the tapping operation, the flag 154 is set to "1" by the master CPU 111. The memory location 155 contains a spindle operation flag "SPCMD_F". The flag 155 is set to "1" by the master CPU 111 at the time of rotation of the spindle, and is set to "2" at the time of the orientation.

In FIG. 10, storage locations 156 through 159 represent X-axis feed command value XCMD_V, Y-axis feed command value YCMD_V, Z-axis feed command value ZCMD V, and B-axis feed command value BCMD V. When command is made from the master CPU 111 with respect to such axial feed, the subsequent feeding distance is written with incremental amount. Further, the memory locations 160, 161 and 162 stand for spindle rotation command value SPCMD_V, feed command velocity FEED V, and tap command pitch PITCH_V, respectively.

Further, storage locations 165, 166, 167 and 168 represent present X-axis position XPOS_V, present Y-axis position YPOS_V, present Z-axis position ZPOS_V, and present B-axis position BPOS_V. The data of the present positions are renewed one after another by the slave CPU 112 in accordance with the execution of the feeding. It should be noted that the M/S RAM 121 can be made to allow various data to be stored in order to perform composite operations of the machine as much as possible.

FIG. 11 shows a memory arrangement with respect to the master/ATC compatible RAM (M/A RAM) 122 through which data or information of the master CPU 111 is transmitted to the ATC CPU 113 and vice versa. A storage location 171 is an execution start flag ASTART_F. If the flag 171 is set to "1" by the master CPU 111, the ATC CPU 113 will start operation with reference to other informations. A storage location 172 is an execution end flag AEND_F. The flag 172 is set to "1" by the ATC CPU 113 when the operation executed through the execution flag ASTART_F 171 is terminated. The operational termination is notified to the master CPU 111. A memory location 173 stores data with respect to a magazine rotation pot number APOT_V. A magazine pot number with respect to a tool which will be used for the next operation is written by the master CPU 111, so that the ATC CPU 113 can notify a new indexing position for the next tool changing operation.

(8) Controlling Concept

With the above described structure, operation in the control device will be described. Machining control with respect to the workpiece and tool changing control are executed in response to the command from the master CPU 111. In the master CPU 111, machining program inputted from the key board 123 and stored in the second master RAM 116 is read one by one, and if the read data pertains to the workpiece machining, the command data is written into the M/S RAM 121. The slave CPU 112 reads out the written command, and determines feeding amount attendant to the motors 22, 125, 126 and 127 and rotation numbers of the spindle 40 in order to carry out the above described workpiece machining control. Similarly, if the read machining program contains tool change information, the command data is written in both M/S RAM 121 and M/A RAM 122. Accordingly, the slave CPU 112 controls the motors 22, 125, 126 126 and the spindle motor 36, and the ATC CPU 113 controls the magazine motor 68 for carrying out the tool change control.

Figure 12:
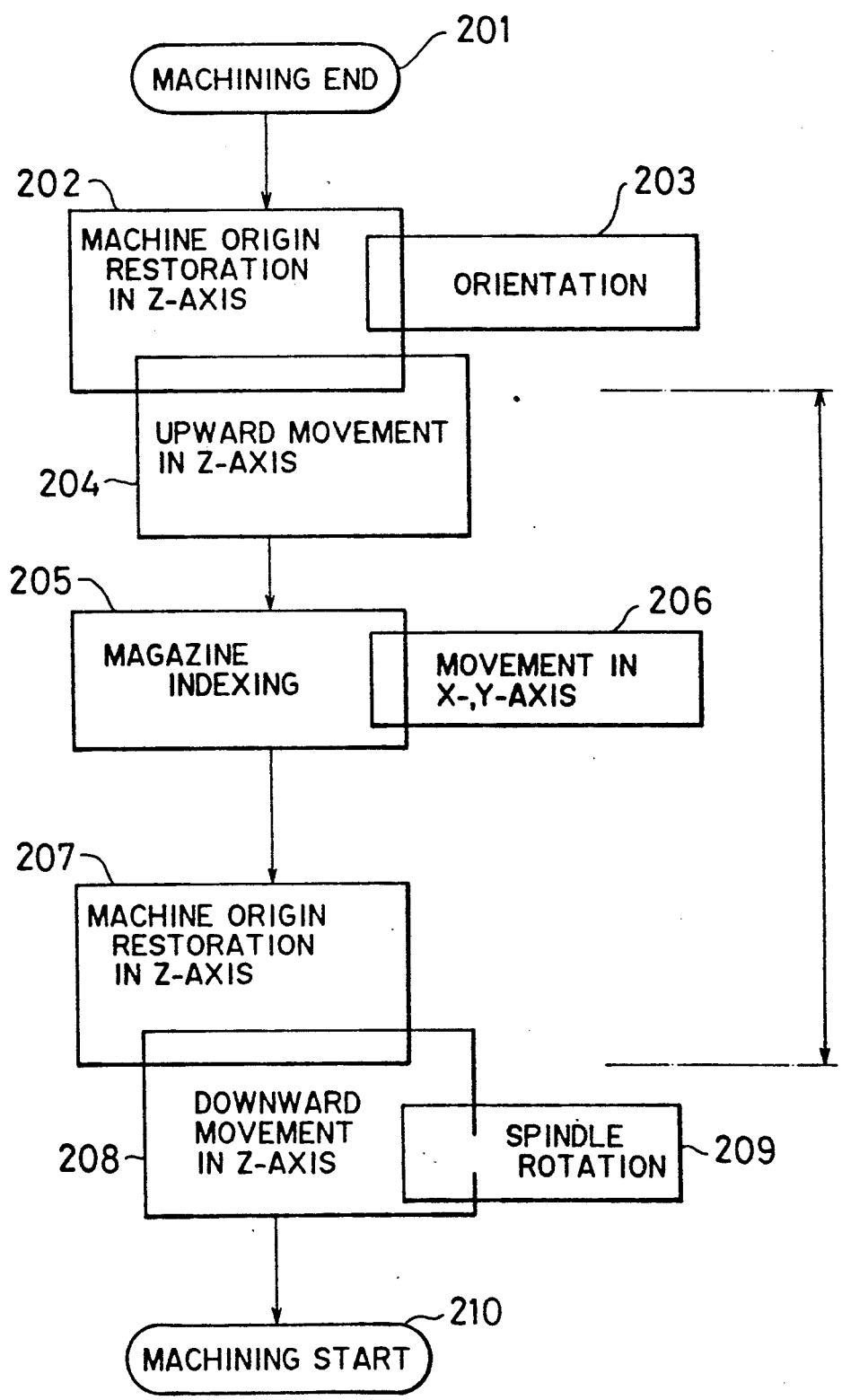
FIG. 12 is a block diagram showing general operation sequence achieved in accordance with the embodiment of this invention.

Tool change control is briefly delineated in FIG. 12. When the machining operation in accordance with the command immediately before the tool changing command is completed, the machine origin restoring operation 202 is promptly started. That is, the elevation of the spindle head 24 is started. In this instance, orientation (recovery of the given spindle position in its rotational direction) 203 is also performed concurrently. Further, on the condition that the spindle orientation 203 is completed, dual control is made with respect to the decelerating operation of the spindle head at a terminal phase of the Z-axis machine origin restoration and accelerating operation 204 of the further upward motion of the spindle head 24 along the Z-axis.

If the spindle head 24 reaches the magazine rotational position positioned adjacent the uppermost position, magazine indexing operation 205 is started to rotate the magazine by the magazine motor 68, to thereby index the tool which will be used for the next machining. During the magazine indexing operation 205, X-axis feed as well as Y-axis feed 206 are also carried out, so that the table is moved to a position for the next machining position. When the magazine indexing operation is terminated, Z-axis machine origin restoration 207 will be started from the ATC region, so that the spindle head 24 is started to move downwardly.

Further, dual control is made with respect to the decelerating operation of the spindle head at the terminal phase of the Z-axis machining origin restoration and accelerating operation 208 of the further downward motion of the spindle head 24. Therefore, the spindle head 24 is moved to the next machining position without the stop at its machine origin Z0. Further, on the condition that the spindle head is moved out of the spindle rotation prohibiting region and the dog 101 is released from the limit switch 102, the spindle rotation 209 is started and is rotated at a rotation numbers for the next machining. Thus, the tool changing operation is terminated, and the next machining 210 is started in accordance with the subsequent command.

As described above, in the automatic tool changing device according to the present invention, the displacement operation 202 of the spindle head 24 from its machining region to the Z-axis machine origin and the spindle orientation 203 are concurrently performed, and further, controls to the machine origin restoratior 202 and the upward movement 204 of the spindle head along the Z-axis are partly overlapped with each other. Furthermore, control to the machine origin restoration 207 from the ATC region and the downward movement 208 of the spindle head along the Z-axis are also partly overlapped with each other. Consequently, reduced is the time period for changing the tool with a new tool.

(9) Processing in the Control Device

The above described controlling concept will be realized by the control device 110 in the following manner.

Figure 13:
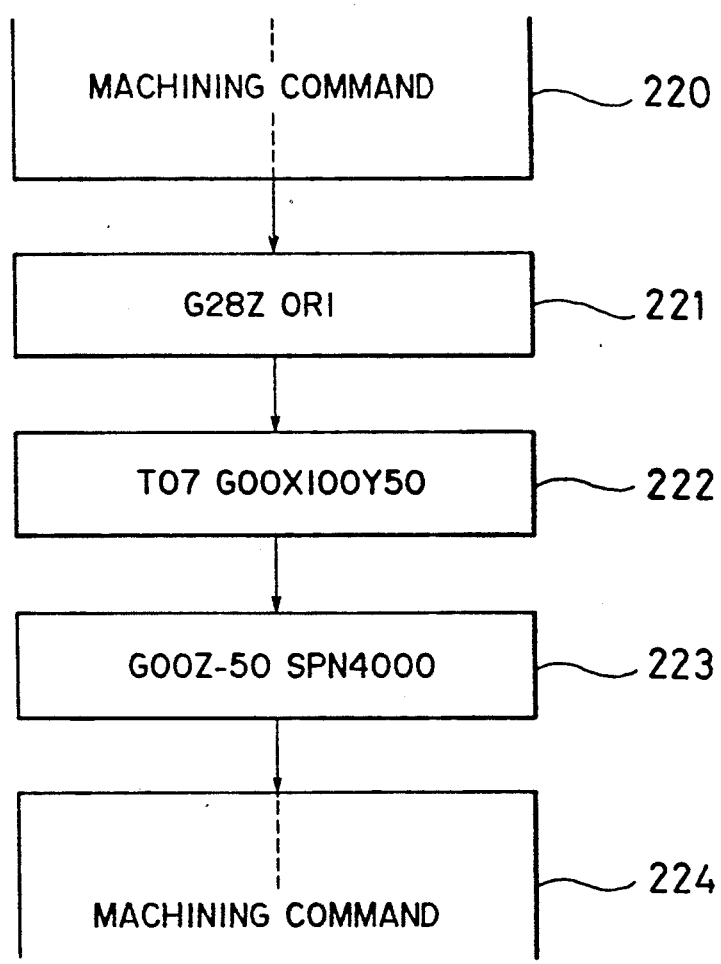
FIG. 13 shows one example of a machining program in connection with the automatic tool changing (ATC) operation according to one embodiment of this invention.

FIG. 13 shows one example of a machining program at the tool changing phase. After the consequential machining command 220, programmed is a composite command 221 consisting of a machine origin restoration command G28Z and a spindle orientation command ORI. Next, programmed is another composite command 222 consisting of a tool change command T07 and a table positioning command G00X100Y50. Here, the tool pot of No. 7 is selected for the next tool to be used. Thereafter, programmed is a still another composite command 223 consisting of a positioning command G00Z-50 for positioning the Z-axis to the next machining position and the spindle rotation command SPN4000. A next machining command 224 is then successively programmed.

Figure 14:
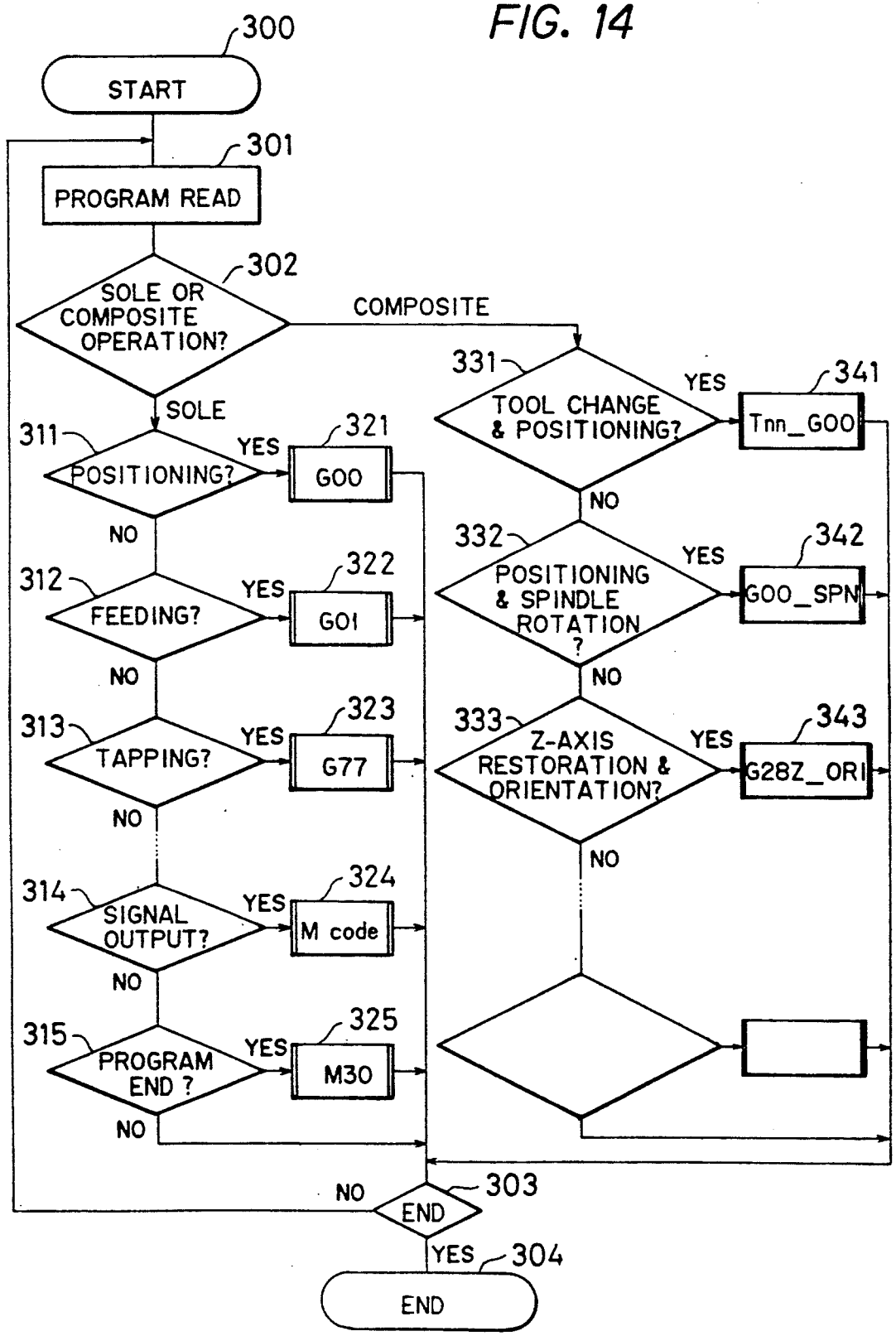
FIG. 14 is a flow chart for description of processing made in a master CPU.

Operational processing in the master CPU 111 is shown by a flowchart of FIG. 14. If the process is started in Step 300, the machining program is read one by one in Step 301. Then, in Step 302, the kind of the operation of the machining program is judged. If the machining program pertains to the sole operation, the routine goes into Step 311 through 315 so as to judge the kind of the sole operation.

For example, in Step 311, judgment is made as to whether or not the machining program is the positioning command G00. If the judgment falls YES, the routine proceeds into Step 321 to perform the positioning process. On the other hand, if the judgment falls NO, the routine proceeds into Step 312 where judgment is made as to whether or not the machining program is the feeding command G01. If the judgment in Step 312 falls YES, the routine proceeds into Step 322 to perform the cut feeding operation. On the other hand, if the judgment falls NO, the routine goes into Step 313 where determination is made as to whether or not the machining program is a tap feeding command G77. If the judgment in Step 313 falls YES, the tap feeding is performed in Step 323. On the other hand, of the judgment falls NO, the routine proceeds into Step 314.

Next, in Step 314, determination is made as to whether the machining program is an auxiliary signal command Mnn. If YES, a signal processing is performed in Step 324, and If NO, the routine goes into Step 315 where judgment is made as to whether or not the machining program is the program termination command M30. Then, the routine goes into Step 325 to perform program termination process. These processings 321 through 325 are carried out with writing commands of necessary flags and data by the master CPU 111 into the M/S RAM 121. The master CPU 111 waits for setting of the execution end flag END_F 152 in the M/S RAM 121 by means of the slave CPU 112. If the execution end flat is set in the M/S RAM 121, the routine goes into Step 303.

On the other hand, in Step 302, if the machining program is judged to be concerned with the composite operation, the routine goes into Step 331 through 333 to determine the kind of the composite operation. For example, in Step 331, judgment is made as to whether or not the program concerns the composite process containing tool change and positioning command. Tnn_G00. If the judgment falls YES, the routine proceeds into Step 341 to perform this composite process. That is, in Step 341, the spindle head 24 is controlled to be moved and the magazine 66 is controlled to be indexed for the tool change in ATC region, and positioning to the table is controlled.

In Step 331, if the judgment falls NO, the routine proceeds into Step 332 where determination is made as to whether or not the program concerns the composite process containing the positioning and spindle rotation command G00 SPN. If YES, corresponding processing is carried out in Step 342. If the judgment in Step 332 falls NO, the routine proceeds into Step 333 where judgment is made as to whether or not the program concerns the composite process containing the machine origin restoration and the spindle orientation command G28N_ORI. If the judgment falls YES, corresponding composite processing is carried out in Step 343. These processing 341 through 343 are carried out with writing commands consisting of predetermined flags and data into the both M/S RAM 121 and the M/A RAM 122.

If the execution end flags END_F152 and AEND_F172 are set, the routine goes into Step 303. In Step 303, determination is made whether or not the all machining program has been finished or not. If NO, the routine goes back to the Step 301 for repeating the above described routine. If all machining program is finished, the routine goes into Step 304 to end the operation.

According to the machining program shown in FIG. 13, the command 221 leads to the Step 343 where the composite controls to the machine origin restoration and the spindle orientation G28Z_ORI are executed. Then, the command 222 leads to the step 341 where the composite controls to the tool change and positioning Tnn_G00 are executed. Thereafter, the command 223 leads to the Step 342 where the composite controls to the positioning and spindle rotation G00_SPN are executed.

Figure 15:
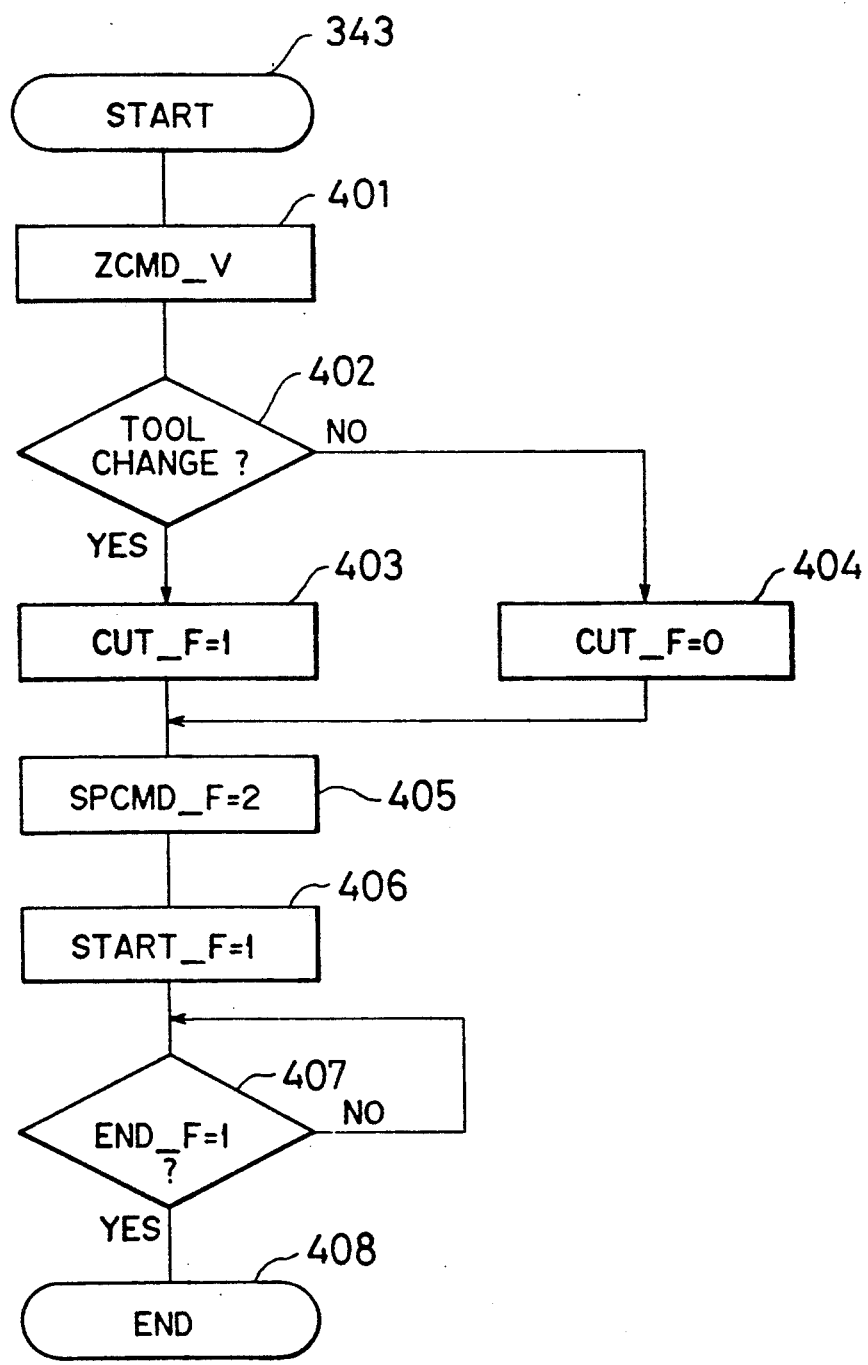
FIG. 15 is a flowchart with respect to a processing in which a machine origin restoration and spindle orientation arc executed.

Next, each of the processings 343, 341 and 342 will be described. FIG. 15 shows a flowchart with respect to the processing 343 where machine origin restoration and spindle orientation are executed. When the processing 343 is started, the Z-axis feed command value ZCMD_V 158 is set in the M/S RAM 121. The Z-axis feed command value ZCMD_V158 is derived by subtracting an inherent Z-axis machine origin Z0 from the present Z-axis position ZPOS_V167 stored in the M/S RAM 121. (ZCMD_V=Z0−ZPOS_V).

Next, in Step 402, determination is made as to whether or not the present Z-axis machine origin restoration is required for the purpose of tool changing operation. This judgment is made on a basis of the question whether or not the tool change command Tnn is provided in the machining program 222 which will next be executed. If the judgment falls YES, the routine proceeds into Step 403, so that the cutting mode flag CUT_F 153 is set to "1". On the other hand, if the judgment in the Step 402 falls NO, the routine goes into Step 404, so that the cutting mode flag CUT_F153 is set to "0". As a result, even though an ordinary machine origin restoration is executed in the positioning mode G00, the cutting mode G01 is provided as far as the machine origin restoration for the purpose of the tool change is executed.

Next, in Step 405, spindle operation flag SPCMD_F160 is set to "2" for the command of the spindle orientation. Thus, preparatory operation is completed. In Step 406, the execution start flag START_F151 is set to "1" so as to start execution instructed to the slave CPU 112. Then, in Step 407, judgment is made as to whether or not the execution end flag END_F 152 is set by the slave CPU 112. The slave CPU 112 sets "1" into the execution end flag END_F152 when completed are both the spindle orientation and Z-axis machine origin restoration.

At this time, since the cutting mode flag CUT_F 153 has been set to "1" in the Step 403, "1" is set by the slave CPU 112 into the execution end flag END_F 152 in spite of the fact that the spindle head 24 has not yet reached the machine origin Z0, simultaneously with the start of the decelerating operation immediately before the arrival of the head 24 to the machine origin. If the execution end flag END_F 152 is set to "1", the routine goes into Step 408 from the Step 407, to thereby complete the present machine origin restoration and spindle orientation 343.

Figure 16A:
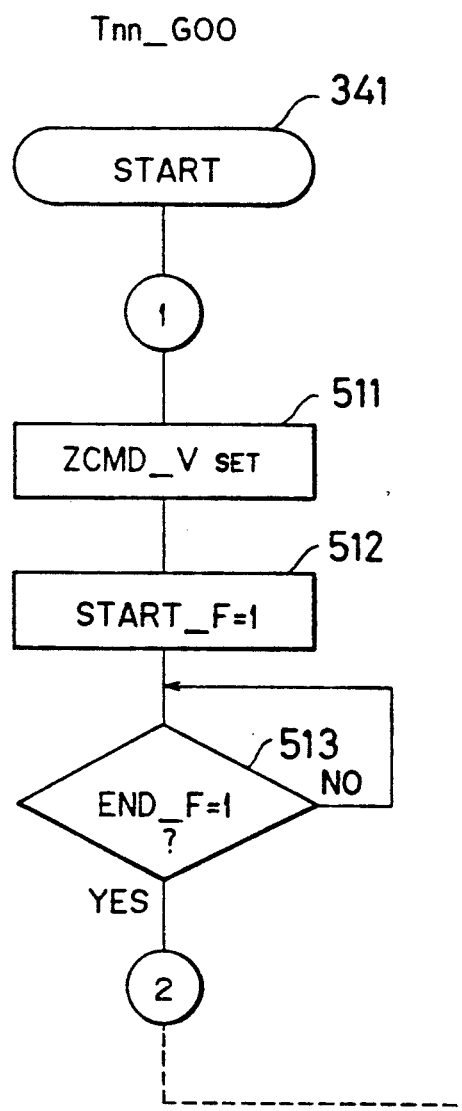
FIGS. 16(a) through 16(c) is a flowchart with respect to a subsequent tool change and positioning processing.
Figure 16B:
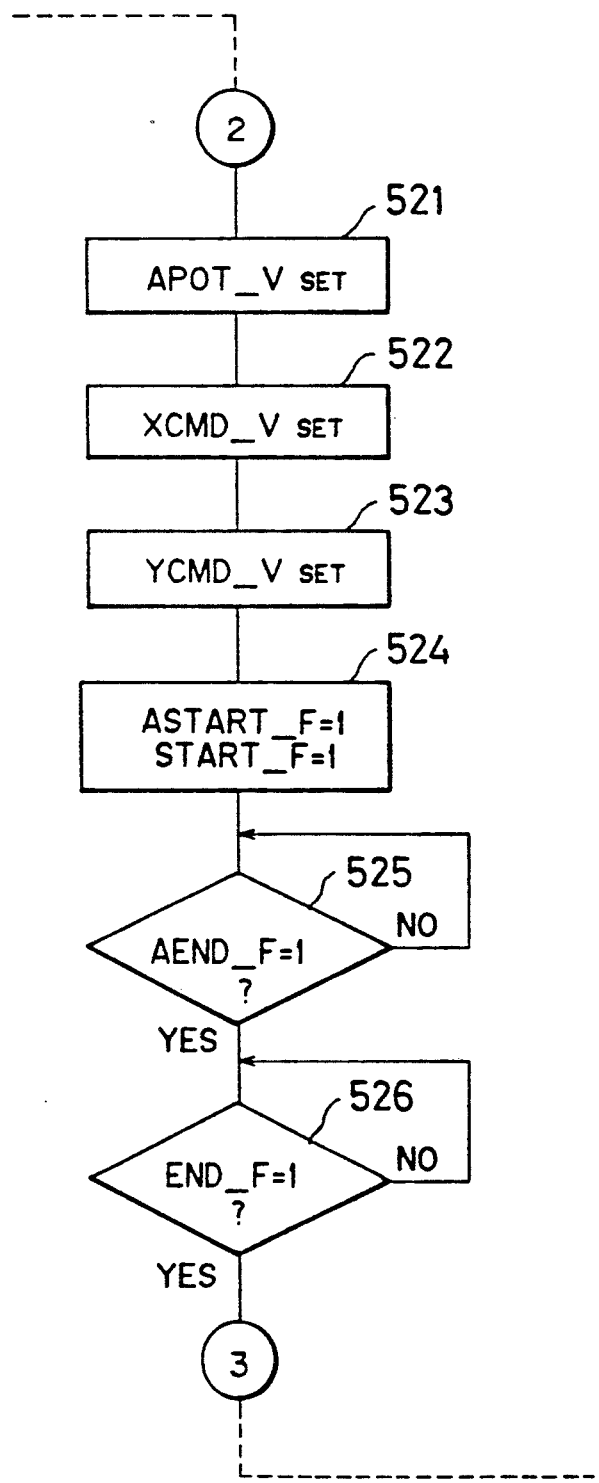
Figure 16C:
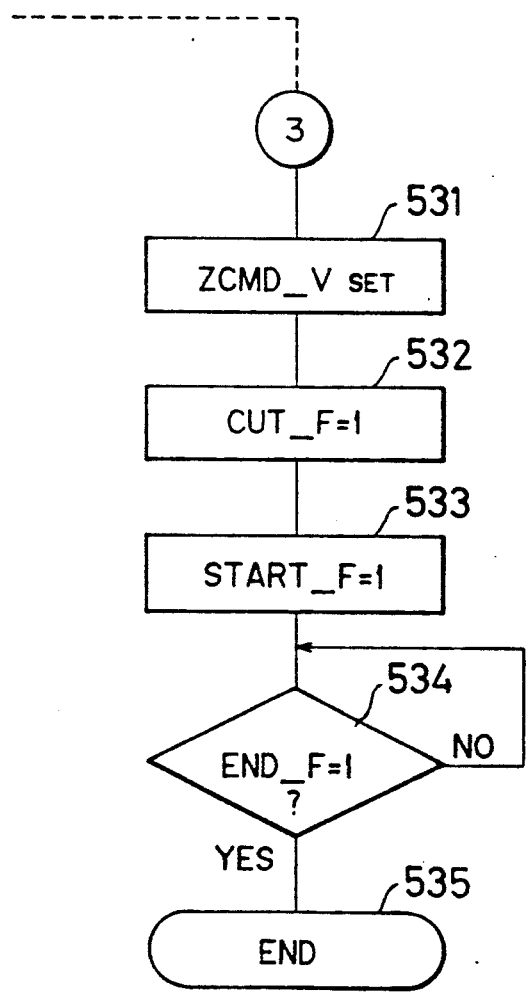

FIG. 16 shows a flowchart with respect to the subsequent tool change and positioning processings 341. The processings 341 includes three phases having first, second and third phases. In the first phase, executed is the spindle head feeding to the magazine rotatable position (Z=138). In the second phase, executed are the rotation of the magazine 66 and the table positioning. In the third phase, executed is the return motion of the spindle head 24 to the machine origin Z0.

If the processing 341 is started, the first phase is started. In Step 511, Z-axis feed command value ZCMD_V 158 is set for feeding the spindle head 24 to the magazine rotatable position. The Z-axis feed command value ZCMD_V 158 is an inherent value extending between the Z-axis machine origin Z0 and a position near an uppermost end in the Z-axis. In the present embodiment, the value of Z=138 is set. In Step 512, the slave CPU 112 will begin to control the motor 22 for the Z-axis feeding. In Step 513, determination is made as to whether or not the execution end flag END_F 152 is set to "1". Thus, the first phase processing is completed, and the routine goes into the second phase.

With regard to the second phase, in Step 521, the pot number instructed through the machining program is written into the magazine rotation pot number APOT_V 173 of the M/A RAM 122. For example, according to the machining program shown in FIG. 13, the pot number of "07" is given. Next, in Step 522, X-axis feed command value XCMD_V 156 is set, and in Step 523, Y-axis feed command value YCMD_V 157 is set. These feed command values are provided by subtracting the present X-axis position XPOS_V 165 and present Y-axis position YPOS V166 from the coordinate X100Y50. Thus, preparatory routine is completed, and the program goes into Step 524 where the execution start flag ASTART_F 171 of the M/A RAM 122 and the execution start flag START_121 of the M/S RAM 151 are set to "1" for starting execution in the ATC CPU 113 and the slave CPU 112. In Step 525 determination is made as to whether or not the processing in the ATC CPU 113 is terminated and the execution end flag AEND_F 172 is set to "1". Further, in Step 526, determination is made as to whether or not the processing in the slave CPU 112 is terminated and the execution end flag END_F 152 is set to "1". Thus, the processing in the second phase is completed, and the routine goes into the third phase.

In Step 531, Z-axis feed command value ZCMD_V 158 is set in order to return the spindle head 24 toward the machine origin Z0. This Z-axis command value ZCMD_V 158 is an inherent value extending between a position adjacent the uppermost position of the spindle head 24 and the Z-axis machine origin Z0. In the present embodiment, Z=−138 is provided. Then, in Step 532, cutting mode flag CUT_F 153 is set to "1", whereupon the Z-axis machine origin restoration is performed under the cutting mode G01. Next, in Step 533, execution slave CPU 112 to start processing, and thereafter in Step 534, judgment is made as to whether or not the execution end flag END_F 152 is set to "1". Here, since the cutting mode flag CUT_F 153 Is set to "1", the execution end flag END_F 152 is set to "1" simultaneously with the start of the deceleration of the spindle head 24 immediately before the spindle head reaching the machine origin Z0. If the execution end flag END_152 is set to "1", the routine goes into Step 535 from the Step 534, to thereby complete the present tool changing and positioning process 341.

Figure 17:
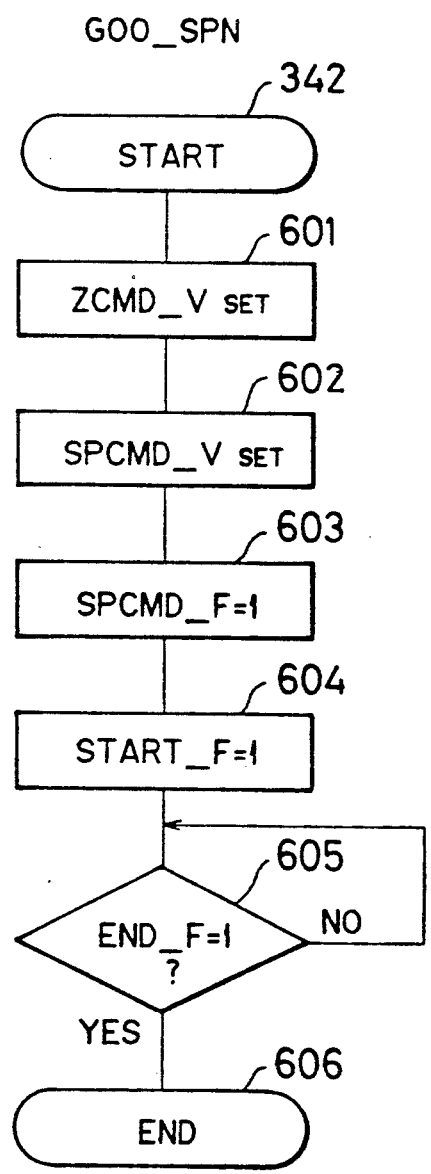
FIG. 17 is a flow chart for description of subsequent Z-axis positioning and spindle rotation processing.

FIG. 17 shows a flowchart for description of the subsequent Z-axis positioning and spindle rotation process 342. When the process 342 is started, Z-axis feed command value ZCMD_V 158 is set in accordance with the instruction in the machining program 223 in Step 601. Then, in Step 602, the spindle rotation command value SPCMD_V 155 is set. Further, in Step 603, the spindle operation flag SPCMD_F 155 is set to "1", so that a clockwise rotation of the spindle is instructed. Thus, the preparatory process is completed. Next, "1", so as to notify the operational start to the slave CPU 112. Then, in Step 605, determination is made as to whether or not the execution end flag END_F 152 is set to "1", If the flag END_F 152 is set to "1", the routine goes into Step 606, to thereby complete Z-axis positioning and spindle rotation process 342.

(10) Operation

FIG. 18 shows a timing chart for description of operations in each of the components in accordance with the control under the above described control device. If the automatic tool changing operation is started, the Z-axis motor 22 is energized so as to start the Z-axis machine origin restoration (701). At the same time, the spindle motor 36 is temporarily deenergized so as to start the spindle orientation (702). This concurrent operations are provided by the processings 343 (401 through 408) shown in FIG. 15. Thereafter, deceleration (703) of the Z-axis motor (decelerated feeding of the spindle head) immediately before the arrival of the spindle head to the machine origin, and the acceleration (704) and subsequent feeding (705) of the spindle head in the ATC region are both provided on the condition that the spindle orientation (702) has been completed. Therefore, the spindle head 24 passes through the machine origin Z0 without its temporarily stop thereat. Such non-stop travel of the spindle head 24 is provided since the cutting mode flag CUT_F 153 is set to "1" in Step 403.

That is, the routine proceeds from the Step 407 to the Step 408, and the subsequent tool changing and positioning process 341 (511 through 535) are started prior to the arrival of the spindle head 24 to the machine origin Z0. In the timing chart of FIG. 18, termination timing of the spindle orientation is slightly delayed. Therefore, the acceleration timing of the Z-axis motor 22 is also delayed, to thereby provide a low level speed period 706.

When the spindle head 24 reaches the magazine rotation position at the position adjacent the uppermost position of the spindle head 24, the magazine motor 68 is energized for indexing the magazine 66 (703A). Simultaneously, the X-axis motor 125 and the Y-axis motor 126 are energized to perform positioning to the table (707). The operations 706 and 707 are carried out by the process shown in the Steps 521 through 526.

When the magazine indexing 66 is completed, the Z-axis motor 22 is again energized. so that the spindle head 24 is moved downwardly toward the machine origin Z0 (708). In this case, the spindle head deceleration 709 at a phase immediately before the spindle head reaching the machine origin and the subsequent spindle head acceleration 710 are both performed without any dead time. Since in the Step 532 the cutting mode flag CUT_F 153 is set to "1", the Step 534 goes into the Step 535 to start Z-axis positioning and spindle rotation processing 342 (601 through 606) immediately before the spindle head 24 reaches the machine origin Z0. Consequently, The spindle head 24 is smoothly entered into the machining region from the ATC region without any temporary stop or suspension in the speed deceleration at the machine origin Z0. As a result, in the present embodiment, the tool changing operation only requires 4.0 seconds, which is in high contrast to the conventional tool changing operation which has required 5.4 seconds.

Further, the rotation of the spindle motor 68 is started (712) simultaneously with the Z-axis positioning 711 on condition that the detection signal from the limit switch 102 and indicative of the spindle rotation inhibiting region disappears. This is due to the fact that in the slave CPU 112 interlocking processing is achieved so as to inhibit the rotation 712 of the spindle motor 36 until the signal from the limit switch 102 disappears, despite the fact that the execution start command has been issued from the master CPU 111 in the Step 604 so that the execution start flag START F15 is set to "1".

Thus, because of the incorporation of the limit switch 102 for detecting the spindle rotation prohibiting region, spindle rotation command process 602, 603, 604 can be executed irrespective of the position of the spindle head 24 at the initial phase of its deceleration 710. Accordingly, simplified processing results in the control device.

In the present embodiment, the limit switch 102 is installed on the column 10 so as to serve as the sensor for detecting the spindle rotation prohibiting region. However, instead of the employment of such physical limit switch 102, a soft ware limit switch may be available. In the latter case, by making use of the present Z-axis position ZXPOS_V 167 stored in the M/S RAM 121, the spindle rotation prohibiting region can be detected by the processing in the slave CPU 112.

(11) Others

In the above illustrated embodiment, the cam mechanism is provided which includes the composite cam member 86 and the first and second cam followers 94 and 96 those being engageable with the composite cam member 86. The cam mechanism serves as "tool transferring means" for transferring a tool between the spindle 40 and the grip portion (grip arm) 82 which has been brought to the predetermined rotating position of the tool magazine 66 in accordance with the movement of the spindle head 24 within the ATC region.

In the above embodiment, the master CPU and the slave CPU execute the process shown in steps 401, 406, 531 and 533 through M/S RAM 121. In these process, the spindle head 24 is moved from one of the machining region and the ATC region to the machine origin Z0 which is the boundary point between the machining region and the ATC region. Therefore, the master CPU and the Slave CPU serve as "machine origin restoration means" in connection with the steps 401, 406, 531 and 533. Further, these CPU also execute the steps 511, 512, 601 and 604 for feeding the spindle head 24 from the machine origin to one of the ATC region and the machining region. In this connection, these serve as "feeding means" for feeding the spindle head 24 from the machine origin to one of the ATC and machining regions.

Further, these master CPU and the slave CPU execute the Step 403, where the cutting mode flag CUT_F 153 is set to "1", In this connection, these CPUs serve as "concurrent execution means". That is, when the composite commands 221 and 222 are programmed for the tool change, the deceleration 703 (FIG. 18) at a phase immediately before arrival of the spindle head to the machine origin Z0 by means of the "machine origin restoration means", and the subsequent acceleration (704) at a phase immediately after the start of execution by means of the "feeding means" are concurrently executed.

Furthermore, these master CPU and the slave CPU execute the Step 407, where determination is made whether or not the spindle orientation is set in the Step 405 and the machine origin restoration have been completed. If the spindle 40 is not stopped at the predetermined angular rotational position by the "spindle orientation means 405", the Step 407 will prohibit the execution of the "concurrent execution means". Therefore, in connection with the Step 407, these CPUs serve as "prohibiting means" for prohibiting the execution of the concurrent execution means.

Moreover, in the Step 532, the cutting mode flag CUT_F 153 is set to "1", Consequently, concurrently carried out are the deceleration 709 of the spindle head at a phase immediately before arrival of the spindle head to the machine origin Z0 during the execution of the "machine origin restoration means" 708 from the ATC region in response to the termination signal 526 from the "rotational indexing means" 706 and acceleration 710 at a phase immediately after the start of the execution of the "feeding means" 711 for the next machining operation. Thus, in connection with the step S532, these CPUs serve as "concurrent execution means" in association with the movement of the spindle head from the ATC region to the machining region.

Further, more, through the Steps 602 through 604, the execution start flag START_F is set to "1" after feed command value ZCMD_V and the spindle rotation command value SPCMD_V are set. Consequently, in connection with the Steps 602 and 603, the CPUs performing this processing serve as "machining start commanding means" which initially imparts rotation 712 to the spindle for the purpose of the start of machining concurrently with the start of the execution of the "feeding means".

Further, more, the slave CPU 112 serves as "execution prohibiting means". That is, the slave CPU 112 performs interlocking processing in such a manner that the slave CPU 112 prohibits rotation of the spindle motor 36 until the signal from the limit switch disappears despite the fact that the execution start command START_F has been issued from the master CPU 111. In other words, the "execution prohibiting means" prohibits the execution of the "machining start commanding means" as far as the "rotation preventing region detecting means" 102 issues the detection signal.

While the invention has been described in detail and with reference to specific embodiment thereof, it would be apparent to those skilled in the art that various changes and modifications may be made therein without departing from the spirit and scope of the invention.

What is claimed is:

1. An automatic tool changing device in a machine tool, including a frame (12); a spindle head (24) provided to the frame and movable between a machining region and automatic tool changing region; a spindle (40) supported to the spindle head and rotatable about a rotation axis extending in a direction parallel to the reciprocating direction of the spindle head; a tool magazine (66) rotatably supported to the frame and having a plurality of grip portions (82) for holding a tool, the grip portions being arranged on a circumferential locations with respect to a rotation axis of the tool magazine; rotational indexing means (68,78,80,72,74,75) for rotating the tool magazine about its rotation axis and positioning one of the grip portions which holds a tool to a predetermined tool indexing position, tool transfer mechanism for permitting the grip portion brought to the predetermined tool indexing position to perform tool transfer operation relative to the spindle in accordance with the movement of the spindle head within the automatic tool changing region; orientation means for stopping rotation of the spindle and positioning the spindle at a predetermined angular position; machine origin restoration means for moving the spindle head positioned at one of the machining region and the automatic tool changing region toward a machine origin (Z0) located at a boundary between the machining region and the automatic tool changing region, and feeding means for feeding the spindle head from the machine origin to one of the improvement comprising:

concurrent execution means (S403, S532) in which deceleration control (703, 709) to the spindle head (24) toward the machine origin (Z0) and the acceleration control (704, 710) for the subsequent movement of the spindle head away from the machine origin by the feeding means (S511, 512, 601, 604) are taken place in overlapping relation.

2. The automatic tool changing device as claimed in claim 1, wherein the concurrent execution means (S403) controls deceleration (703) of the spindle head (24) by the execution of the machine origin restoration means (401,406) at a phase immediately before arrival of the spindle head to the machine origin, and also controls acceleration (704) of the spindle head (24) by the execution of the feeding means (S511, S512,705) at a phase immediately after the departure of the spindle head from the machine origin.

3. The automatic tool changing device as claimed in claim 2, further comprising prohibiting means (S407) for prohibiting execution of the concurrent execution means (S403) if the spindle orientation and the machine origin restoration have not yet been completed.

4. The automatic tool changing device as claimed in claim 1, wherein the concurrent execution means (S532) controls, in response to a termination signal (526) from the rotational indexing means, deceleration (709) of the spindle head (24) by the execution of the machine origin restoration means (S531, S533) at a phase immediately before arrival of the spindle head to the machine origin, and also controls acceleration (710) of the spindle head (24) by the execution of the feeding means (S602, S604,711) at a phase immediately after the departure of the spindle head from the machine origin.

5. The automatic tool changing device as claimed in claim 4, further comprising
  a detection means (102) for detecting a region where the rotation of the spindle is prohibited within a specific automatic tool changing region;
  machining start commanding means (602, 603) for previously imparting rotation (712) on the spindle concurrently with the start of execution of the feeding means (S602, S604); and
  execution prohibiting means (112) for prohibiting execution of the machining start commanding means (602,603) as far as the detection mears (102) detects the spindle rotation prohibiting region.

* * * * *